(12) United States Patent
Kosaka et al.

(10) Patent No.: US 11,970,644 B2
(45) Date of Patent: Apr. 30, 2024

(54) METHOD FOR PEELING PRESSURE-SENSITIVE ADHESIVE SHEET

(71) Applicant: Nitto Denko Corporation, Ibaraki (JP)

(72) Inventors: Naofumi Kosaka, Ibaraki (JP); Yosuke Shimizu, Ibaraki (JP); Satoshi Honda, Ibaraki (JP); Taiki Shimokuri, Ibaraki (JP); Shou Takarada, Ibaraki (JP); Masayuki Satake, Ibaraki (JP); Kenichi Okada, Ibaraki (JP); Atsushi Takashima, Ibaraki (JP); Ginji Mizuhara, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 542 days.

(21) Appl. No.: 16/967,517

(22) PCT Filed: Jan. 28, 2019

(86) PCT No.: PCT/JP2019/002784
§ 371 (c)(1),
(2) Date: Aug. 5, 2020

(87) PCT Pub. No.: WO2019/151192
PCT Pub. Date: Aug. 8, 2019

(65) Prior Publication Data
US 2021/0230455 A1    Jul. 29, 2021

(30) Foreign Application Priority Data

Feb. 5, 2018  (JP) .................................. 2018-018621
Jun. 7, 2018  (JP) .................................. 2018-109385
Jul. 3, 2018  (JP) .................................. 2018-126577

(51) Int. Cl.
*B32B 43/00*    (2006.01)
*B32B 7/06*    (2019.01)
(Continued)

(52) U.S. Cl.
CPC ............... *C09J 7/385* (2018.01); *B32B 7/06* (2013.01); *B32B 7/12* (2013.01); *B32B 43/006* (2013.01);
(Continued)

(58) Field of Classification Search
CPC ............ B32B 43/006; Y10T 156/1111; Y10T 156/1126; Y10T 156/1928
See application file for complete search history.

(56) References Cited

U.S. PATENT DOCUMENTS

2008/0113486 A1*  5/2008  Eguchi ................ G02F 1/13306
                                                                438/735
2008/0128076 A1*  6/2008  Nimura .................. B29B 17/02
                                                                156/763
(Continued)

FOREIGN PATENT DOCUMENTS

CN    1618602 A      5/2005
EP    3 750 963 A1   12/2020
(Continued)

OTHER PUBLICATIONS

English translation of the International Preliminary Report on Patentability issued for corresponding International Patent Application No. PCT/JP2019/002784 dated Aug. 11, 2020.
(Continued)

*Primary Examiner* — Michael N Orlando
*Assistant Examiner* — Nickolas R Harm
(74) *Attorney, Agent, or Firm* — Hauptman Ham, LLP (57) ABSTRACT

Provided is a method for peeling a PSA sheet adhered on a polarizing plate. The PSA sheet has a PSA layer. The PSA layer includes a layer A forming at least one surface of the PSA layer. Of the polarizing plate, the surface to which the PSA sheet is adhered is corona-treated or plasma-treated. The peeling method includes a water-peel step in which the
(Continued)

PSA sheet is peeled from the polarizing plate, in a state where an aqueous liquid exits at the interface between the polarizing plate and the PSA sheet at the front line of peeling the PSA sheet from the polarizing plate, with the aqueous liquid allowed to further enter the interface following the movement of the peel front line.

7 Claims, 1 Drawing Sheet

(51) Int. Cl.
  *B32B 7/12* (2006.01)
  *C09J 5/02* (2006.01)
  *C09J 7/38* (2018.01)
  *C09J 133/08* (2006.01)
(52) U.S. Cl.
  CPC ............... *C09J 5/02* (2013.01); *C09J 133/08* (2013.01); *B32B 2307/42* (2013.01); *C09J 2301/312* (2020.08); *C09J 2301/416* (2020.08); *C09J 2301/502* (2020.08); *Y10T 156/1111* (2015.01); *Y10T 156/1126* (2015.01); *Y10T 156/1928* (2015.01)

(56) References Cited

U.S. PATENT DOCUMENTS

| 2011/0008552 A1 | 1/2011 | Umemoto et al. |
| 2014/0234664 A1 | 8/2014 | Yasumoto et al. |
| 2015/0144271 A1 | 5/2015 | Fujita |

FOREIGN PATENT DOCUMENTS

| JP | H9-100448 A | 4/1997 |
| JP | H10-125768 A | 5/1998 |
| JP | H11-90820 A | 4/1999 |
| JP | 2005-148638 A | 6/2005 |
| JP | 2013-117004 A | 6/2013 |
| JP | 2015-101720 A | 6/2015 |
| JP | 2017-101136 A | 6/2017 |
| KR | 10-2008-0033071 A | 4/2008 |
| TW | 201726873 A | 8/2017 |
| WO | 2009113616 A1 | 9/2009 |
| WO | 2017094474 A1 | 6/2017 |

OTHER PUBLICATIONS

Extended European Search Report dated Sep. 15, 2021 for corresponding European Patent Application No. 19747282.2.
International Search Report dated Apr. 9, 2019 in connection with corresponding International Patent Application No. PCT/JP2019/002784.
Office Action dated Jul. 19, 2022 for corresponding Taiwanese Patent Application No. 108103779, along with an English translation (11 pages).
Office Action dated Sep. 30, 2021 for corresponding Chinese Patent Application No. 201980010903.9, along with an English translation.
Office Action dated Apr. 18, 2023 for corresponding Vietnamese Patent Application No. 1-2020-04935, along with an English translation (4 pages).
Office Action dated Aug. 16, 2023 for corresponding Korean Patent Application No. 10-2020-7025217, along with an English machine translation (8 pages).

* cited by examiner

METHOD FOR PEELING PRESSURE-SENSITIVE ADHESIVE SHEET

CROSS-REFERENCE TO RELATED APPLICATION

The present application is a national stage filing under 35 U.S.C § 371 of PCT application number PCT/JP2019/002784 filed on Jan. 28, 2019 which is based upon and claims the benefit of priorities to Japanese Patent Application No. 2018-018621 filed on Feb. 5, 2018, Japanese Patent Application No. 2018-109385 filed on Jun. 7, 2018, and Japanese Patent Application No. 2018-126577 filed on Jul. 3, 2018 in the Japanese Intellectual Property Office, which are incorporated herein in their entireties by reference.

TECHNICAL FIELD

The present invention relates to a method for peeling a pressure-sensitive adhesive sheet.

BACKGROUND ART

In general, pressure-sensitive adhesive (PSA) exists as a soft solid (a viscoelastic material) in a room temperature range and has a property to adhere easily to an adherend with some pressure applied. For such a property, PSA has been widely used in various fields as an on-support PSA sheet having a PSA layer on a support or as a support-less PSA sheet free of a support.

CITATION LIST

Patent Literature

[Patent Document 1] Japanese Patent Application Publication No. 2005-148638

SUMMARY OF INVENTION

Technical Problem

Various properties are required of PSA depending on the purposes. Among these properties, some are difficult to simultaneously achieve at a high level such that in improving a certain property, some other property has a tendency to decrease. One example of a set of properties in a trade-off relationship is adhesive strength to adherend and ease of rework. The term "rework" refers to the work of removing a PSA sheet from its adherend and re-applying the sheet in case of inadequate application (improper placement, wrinkling, bubble formation, trapping of foreign material, etc.), in case of finding a defect in the adherend after the PSA sheet is applied, etc. With respect to a method for peeling an adhesive optical film from an optical film-bearing substrate wherein the adhesive optical film is adhered to the surface of the substrate (adherend) such as a glass plate, Patent Document 1 discloses a technique of peeling the adhesive optical film from the substrate in a state where a liquid exists at the peel interface between the substrate and the PSA layer of the adhesive optical film. On the other hand, in Patent Document 1, no studies are conducted with respect to a method for peeling a PSA sheet adhered to a polarizing plate, that is, a PSA sheet peeling method when the adherend is a polarizing plate.

An objective of the present invention is thus to provide a PSA sheet peeling method by which a PSA sheet can be easily peeled from a polarizing plate as an adherend with the use of an aqueous liquid such as water.

Solution to Problem

This Description provides a method for peeling a PSA sheet adhered on a polarizing plate as an adherend. In the polarizing plate, the surface to which the PSA sheet is adhered is corona-treated or plasma-treated. The PSA sheet has a PSA layer, the PSA layer including a layer A forming at least the polarizing plate side surface of the PSA layer. The peeling method may include a water-peel step in which the PSA sheet is peeled from the polarizing plate, in a state where an aqueous liquid exits at the interface between the polarizing plate and the PSA sheet at the front line of peeling the PSA sheet from the polarizing plate, with the aqueous liquid allowed to further enter the interface following the movement of the peel front line. Here, the peel front line refers to where the PSA sheet starts to separate from the polarizing plate when peeling of the PSA sheet from the polarizing plate is allowed to proceed. According to the water peel step, the PSA sheet can be peeled from the polarizing plate with effective use of the aqueous liquid. In some embodiments, the layer A is preferably formed with a PSA comprising a hydrophilicity enhancer.

The peeling method can be preferably practiced in an embodiment where the peel front line is allowed to move at a speed of 10 mm/min or higher. According to such an embodiment, the PSA sheet can be efficiently peeled from a polarizing plate.

Preferable embodiments of the present invention are described below. Matters necessary to practice this invention other than those specifically referred to in this Description can be understood by a person skilled in the art based on the disclosure about implementing the invention in this Description and common technical knowledge at the time the application was filed. The present invention can be practiced based on the contents disclosed in this Description and common technical knowledge in the subject field. In the following drawings, components or units having the same functions may be described with the same symbols allocated and the redundant description may be omitted or simplified. The embodiments illustrated in the drawings are schematic in order to clearly describe the present invention and the drawings do not accurately represent the size or scale of products actually provided.

As used herein, the term "acrylic polymer" refers to a polymer derived from a starting monomer mixture including more than 50% acrylic monomer by weight. The acrylic monomer refers to a monomer having at least one (meth) acryloyl group per molecule. As used herein, the term "(meth)acryloyl" comprehensively refers to acryloyl and methacryloyl. Similarly, the term "(meth)acrylate" comprehensively refers to acrylate and methacrylate, and the term "(meth)acryl" comprehensively refers to acryl and methacryl.

<Examples of Constitution of PSA Sheet>

Figure 1:
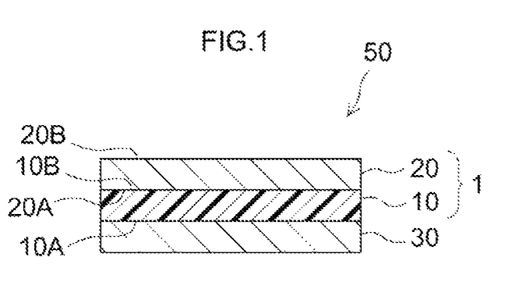
FIG. 1 shows a cross-sectional diagram schematically illustrating a PSA sheet.

FIG. 1 shows an example of the constitution of the PSA sheet that can be used in the PSA sheet peeling method disclosed herein. PSA sheet 1 is formed as an adhesively single-faced PSA sheet comprising a PSA layer 10 whose first surface 10A is an adhesion face (i.e. the surface on the polarizing plate side) to a polarizing plate as adherend, and a support 20 laminated on the second surface 10B of PSA layer 10. PSA layer 10 is permanently bonded to a first face 20A of support 20. As support 20, for instance, plastic film such as polyester film can be used. In the example shown in FIG. 1, PSA layer 10 has a monolayer structure. In other words, the entire PSA layer 10 is formed of the layer A forming the first surface (adhesive face) 10A of PSA layer 10. PSA sheet 1 is used by applying the first surface 10A to the polarizing plate as adherend. PSA sheet 1 prior to use (before applied to adherend) may have, for instance as shown in FIG. 1, a form of release-linered PSA sheet 50 in which adhesive face 10A is protected with release liner 30 having a releasable surface (release face) at least on the PSA layer side. Alternatively, it may have a form where the second face 20B (the reverse side of the first face 20A, or the backside) of support 20 is a release face and adhesive face 10A is protected, wound or layered with the second face 20B in contact with adhesive face 10A.

As for the release liner, no particular limitations are imposed. For example, it is possible to use a release liner in which a surface of a liner substrate such as resin film or paper is release-treated, or a release liner formed from a low adhesive material such as fluorine-based polymer (polytetrafluoroethylene, etc.) and polyolefin-based resin (polyethylene, polypropylene, etc.). For the release treatment, for instance, a release agent such as silicone-based and long-chain alkyl-based release agents can be used. In some embodiments, release-treated resin film can be preferably used as the release liner.

Figure 2:
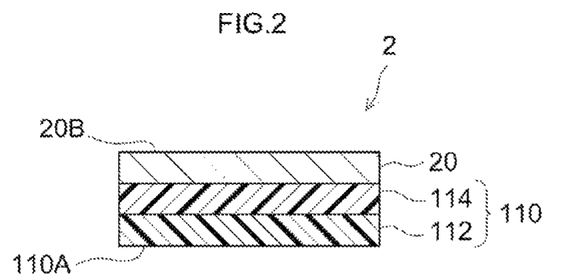
FIG. 2 shows a cross-sectional diagram schematically illustrating another PSA sheet according to another embodiment.

FIG. 2 shows another example of the constitution of the PSA sheet that can be used in the PSA sheet peeling method disclosed herein. PSA sheet 2 is formed as an adhesively single-faced PSA sheet comprising a PSA layer 110 whose first face 110A is an adhesion face to adherend, and a support 20 laminated on the second face of PSA layer 110. PSA layer 110 has a two-layer structure formed of a layer A 112 forming first face (adhesive face) 110A, and a layer B 114 laminated on the backside of layer A 112. Similar to PSA sheet 1 shown in FIG. 1, PSA sheet 2 prior to use (before applied to adherend) may have a form of release-linered PSA sheet in which adhesive face 110A is protected with a release liner not shown in the drawing. Alternatively, it may in an embodiment where the second face 20B of support 20 is a release face and the PSA sheet is wound or layered so that adhesive face 110A is in contact with and protected with second face 20B.

The PSA sheet used in the PSA sheet peeling method disclosed herein may have a form of support-less double-faced PSA sheet formed of a PSA layer. Such a support-less double-faced PSA sheet can be used, for instance, by bonding a support to the second face of the PSA layer.

The PSA sheet peeling method disclosed herein can be preferably practiced in an embodiment where a PSA sheet is peeled from a PSA sheet-bearing member in which the first surface (i.e. the layer A side surface) of the PSA layer forming the PSA sheet is adhered to the member. Here, the member is a polarizing plate, in particular, a polarizing plate that has a corona-treated or plasma-treated surface (face subject to adhesion) on the side bearing the PSA sheet. The polarizing plate generally has a structure in which a polarizing film is placed between two sheets of triacetyl cellulose (TA) film. Of the two sheets of TAC film, at least the TAC film placed on the PSA sheet-bearing side is preferably protected on its surface (face subject to adhesion) with a hard coat layer. The hard coat layer is preferably formed from a urethane acrylate-based material. The polarizing plate may have a configuration in which an anti-glare layer is further provided on top of the hard coat layer.

Figure 3:
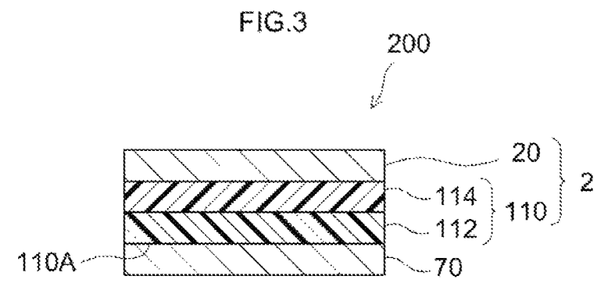
FIG. 3 shows a cross-sectional diagram schematically illustrating a PSA sheet-bearing member wherein another PSA sheet is adhered to a member.

For instance, as shown in FIG. 3, the PSA sheet-bearing member can be a PSA sheet-bearing member 200 in which a first surface (polarizing plate side surface) 110A of PSA layer 110 of PSA sheet 2 shown in FIG. 2 is adhered to a member (polarizing plate) 70. It can also be a PSA sheet-bearing member having a configuration in which, in place of PSA sheet 2 shown in FIG. 2, first surface 10A of PSA sheet 1 shown in FIG. 1 is adhered to member (polarizing plate) 70.

<Properties of PSA Sheet>

The PSA sheet used in the peeling method of this invention preferably has a water-resistant adhesive strength reduction rate of 30% or lower and a water-peel adhesive strength reduction rate of 40% or higher. The water-resistant adhesive strength reduction rate (%) is defined as a value determined from its normal adhesive strength N0 (N/10 mm) and water-resistant adhesive strength N1 (N/10 mm) according to $(1-(N1/N0))\times100$. The water-peel adhesive strength reduction rate is defined as a value determined from its normal adhesive strength N0 (N/10 mm) and water-peel strength N2 according to $(1-(N2/N0))\times100$. Normal adhesive strength N0, water-resistant adhesive strength N1 and water-peel strength N2 are determined by the methods shown below. The same measurement methods are used in the Examples described later.

[Determination of Normal Adhesive Strength N0]

A PSA sheet subject to measurement is cut to a 10 mm wide 120 mm long rectangular shape to prepare a test piece. The layer A side of the test piece is adhered to an adherend with a hand-held roller to obtain a test sample. The test sample is placed in an autoclave and treated at a pressure of 5 atm and a temperature of 50° C. for 15 minutes.

The test sample is removed from the autoclave and stored in an environment at 23° C. and 50% RH for one day. Subsequently, in the same environment, a cutting knife is inserted into the interface between the test piece and the adherend to separate one end of the length direction of the test piece from the adherend; and the peel strength is determined based on JIS Z0237, using a tensile tester at a tensile speed of 300 mm/min and a peel angle of 180°.

[Determination of Water-Resistant Adhesive Strength N1]

A PSA sheet subject to measurement is cut to a 10 mm wide 120 mm long rectangular shape to prepare a test piece. The layer A side of the test piece is adhered to an adherend with a hand-held roller to obtain a test sample. The test sample is placed in an autoclave and treated at a pressure of 5 atm and a temperature of 50° C. for 15 minutes.

The test sample is removed from the autoclave, stored in an environment at 23° C. and 50% RH for one day, and then immersed in water at room temperature (23° C. to 25° C.) for 30 minutes. As the water, ion exchange water or distilled water is used. In the water, the test sample is horizontally held with the test piece-bearing side up. The distance (immersion depth) from the top face of the test sample to the water surface should be 10 mm or greater (e.g. about 10 mm to 100 mm). Subsequently, the test sample is taken out from the water and any residual water on the test sample is gently wiped off. A cutting knife is then inserted into the interface between the test piece and the adherend to separate one end of the length direction of the test piece from the adherend; and in an environment at 23° C. and 50% RH, the peel strength is determined based on JIS Z0237, using a tensile tester at a tensile speed of 300 mm/min and a peel angle of 180°. After taken out from the water, the test sample should be subjected to peel strength measurement within 10 minutes.

[Determination of Water-Peel Strength N2]

A PSA sheet subject to measurement is cut to a 10 mm wide 120 mm long rectangular shape to prepare a test piece. The layer A side of the test piece is adhered to an adherend with a hand-held roller to obtain a test sample. The test sample is placed in an autoclave and treated at a pressure of 5 atm and a temperature of 50° C. for 15 minutes.

The test sample is removed from the autoclave and stored in an environment at 23° C. and 50% RH for one day. Subsequently, in the same environment, near one end of the length direction of the test piece, one drop (about 10 μL to about 40 μL) of distilled water is dropped onto the adherend surface exposed off the one end. A cutting knife is then inserted into the interface between the test piece and the adherend to allow the water to enter the interface. After this, without additional supply of water, the peel strength is determined based on JIS Z0237, using a tensile tester at a tensile speed of 300 mm/min and a peel angle of 180°. It is noted that the water used in measurement of water-peel strength N2 is only the one drop of distilled water dropped onto the adherend before the start of peeling.

In the measurement of normal adhesive strength N0, water-resistant adhesive strength N1 and water-peel strength N2, the adherend used is a polarizing plate configured to have a polarizing film placed between two sheets of TAC film, wherein, on the PSA sheet-bearing side surface (face subject to adhesion), a hard coat layer as a protective layer and an anti-glare layer are layered in this order; and the surface (face subject to adhesion) has been subjected to corona treatment. The corona treatment of the face subject to adhesion is carried out immediately before a test piece is adhered to an adherend (typically no earlier than 30 minutes before the adhesion) by allowing the adherend to pass once through AGF-012 (table-style surface corona treatment system) available from KASUGA with the output setting at 3 (0.17 kW) and table speed gauge at 20 (corresponding to 3 m/mm speed). The test piece is adhered to the adherend so that the distance from a peripheral edge of the test piece to a peripheral edge of the adherend is at least 10 mm or greater, or preferably 15 mm or greater. As the tensile tester, a universal tensile/compression testing machine (machine name "tensile and compression testing machine, TCM-1kNB" available from Minebea Co., Ltd.) or a comparable product can be used. The measurement of peel strength is carried out so that peeling of the test piece adhered to the adherend proceeds upward from the bottom. For the measurement, a suitable backing material can be applied to the backside (the reverse side of the layer A surface) as necessary to reinforce the test piece. As the backing material, for example, an about 25 m thick polyethylene terephthalate film can be used. As the adherend, as a substitute for the polarizing plate having the configuration described above, it is possible to use a TAC film that has a surface comparable to the configuration on the adhesion face side of the polarizing plate, that is, a surface on which a hard coat layer and an anti-glare layer are layered in this order, wherein the surface has been subjected to corona treatment. The hard coat layer and the anti-glare layer can be formed by the method described later in the working examples.

(Water-Peel Adhesive Strength Reduction Rate)

The peeling method of this invention is preferably applied to a PSA sheet having a water-peel adhesive strength reduction rate of 40% or higher. A PSA sheet showing such a water-peel adhesive strength reduction rate can be easily peeled from a polarizing plate by using an aqueous liquid such as water. For instance, supply a small amount of aqueous liquid to the adherend (polarizing plate) with the PSA sheet adhered thereto, allow the aqueous liquid to enter the interface between the PSA sheet and the adherend to provide a trigger for peeling, and then peel the PSA sheet. By this, the peel strength of the PSA sheet to the adherend can be greatly reduced. This property helps combine high adhesive strength and good reworkability for normal use. In some embodiments, the water-peel adhesive strength reduction rate may be, for instance, 50% or higher, 65% or higher, 75% or higher, 85% or higher, 90% or higher, 95% or higher, or even 97% or higher. The water-peel adhesive strength reduction rate is theoretically 100% or lower and typically below 100%.

(Water-Resistant Adhesive Strength Reduction Rate)

It is preferable that the PSA sheet to which the peeling method of this invention is applied can be easily peeled using an aqueous liquid such as water as described above and has a water-resistant adhesive strength reduction rate of 30% or lower, it provides excellent water resistance reliability. From the standpoint of obtaining greater water resistance reliability, the water-resistant adhesive strength reduction rate is preferably, for instance, 20% or lower, more preferably 10% or lower, or possibly 7% or lower. The water-resistant adhesive strength reduction rate is typically 0% or higher. The PSA sheet can be preferably made in an embodiment where the difference between the water-peel adhesive strength reduction rate (%) and the water-resistant adhesive strength reduction rate (%) is, for instance, 45% or greater, 55% or greater, or 70% or greater, 80% or greater, or 90% or greater.

From the standpoint of the bonding reliability, the PSA sheet to which the peeling method disclosed herein is applied preferably has a normal adhesive strength N0 of 2.0 N/10 mm or greater. In some embodiments, the normal adhesive strength N0 can be, for instance, 2.5 N/10 mm or greater, 3.0 N/10 mm or greater, 3.5 N/10 mm or greater, or even 4.0 N/10 mm or greater. The maximum normal adhesive strength N0 is not particularly limited. For instance, it can be 30 N/10 mm or less. In some embodiments, the normal adhesive strength N0 can be 20 N/10 mm or less, or even 15 N/10 mm or less.

The water-peel strength N2 is preferably up to 60%, more preferably up to 50% of the normal adhesive strength N0. While no particular limitations are imposed, the water-peel strength N2 can be, for instance, 10 N/10 mm or less, 3.5 N/10 mm or less, 2.5 N/10 mm or less, 1.6 N/10 mm or less, 1.2 N/10 mm or less, or even 1.0 N/10 mm or less. According to the PSA sheet having a low water-peel strength N2, it is possible to reduce the load applied to the adherend when peeling the PSA sheet. This is particularly significant, for instance, in an embodiment of peeling the PSA sheet from a polarizing plate having a thin surface layer such as a hard coat layer and an anti-glare layer. The PSA sheet can be also made in an embodiment where the water-peel strength N2 is, for instance, 0.75 N/10 mm or less, 0.50 N/10 mm or less, 0.25 N/10 mm or less, or even 0.15 N/10 mm or less. The minimum water-peel strength N2 is not particularly limited. It can be essentially 0 N/10 mm, or greater than 0 N/10 mm.

From the standpoint of enhancing the reworkability, in the measurement of water-peel strength N2, it is preferable that the PSA sheet peels from the adherend without leaving the PSA on the adherend. That is, the PSA sheet preferably has excellent anti-residue properties. The presence or absence of residual PSA left on the adherend can be determined, for instance, by visually observing the adherend after the PSA sheet is peeled.

The ratio (N2/N0) of the water-peel strength N2 (N/10 mm) to the normal adhesive strength N0 (N/10 mm) can be, for instance, 1/2.5 or less, 1/5 or less, or even 1/10 or less. A smaller N2/N0 ratio means a more significant decrease in water-peel strength N2 relative to the normal adhesive strength N0. The peeling method disclosed herein can be preferably implemented in an embodiment of peeling a PSA sheet having a N2/N0 ratio of 1/15 or less, 1/25 or less, or 1/35 or less from a polarizing plate. The maximum N2/N0 ratio value is not particularly limited. For instance, it can be 1/200 or greater, 1/150 or greater, or even 1/100 or greater.

In the PSA sheet disclosed herein, the PSA that forms the layer A constituting at least the polarizing plate side surface of the PSA layer is preferably water-insoluble. According to the water-insoluble layer A, the resulting PSA sheet is likely to have a high water-resistant adhesive strength N1 and a low water-resistant adhesive strength reduction rate. The water-insoluble layer A is also preferable from the standpoint of preventing leftover PSA on the adherend during the peel using an aqueous liquid such as water. In addition, the water-insoluble layer A can also be advantageous from the standpoint of preventing the transparency of the PSA sheet from decreasing due to water immersion or the surrounding moisture.

The PSA forming the layer A is preferably non-water-swellable. According to the non-water-swellable layer A, the resulting PSA sheet is likely to have a high water-resistant adhesive strength N1 and a low water-resistant adhesive strength reduction rate. It can also exhibit good peeling properties with effective use of a small amount of aqueous liquid. The non-water-swellable layer A is also preferable from the standpoint of preventing leftover PSA on the adherend during the peel using an aqueous liquid. In addition, the non-water-swellable layer A can also be advantageous from the standpoint of preventing the transparency of the PSA sheet from decreasing due to water immersion or the surrounding moisture.

Here, in this Description, PSA being water-insoluble means that it has a 75% or higher gel fraction, determined by the method described below. PSA being non-water-swellable means that it has a degree of swelling of 2 or less, determined by the method described below.

Specifically, about 0.5 g of a PSA subject to measurement is weighed, and its weight is defined as W1. This PSA is immersed in 500 mL of distilled water at room temperature (about 23° C.) for 48 hours, filtered through a nylon mesh, and the weight W2 of the water-containing PSA is measured. Subsequently, the PSA is allowed to dry at 130° C. for 5 hours and the weight W3 of non-volatiles is measured. The gel fraction and the degree of swelling are calculated by the following equations:

Gel fraction (%)=($W3/W1$)×100

Degree of swelling=$W2/W1$

In some embodiments, the layer A may have a gel fraction of, for instance, 80% or higher, 90% or higher, 95% or higher, or even 98% or higher. The gel fraction of the layer A is theoretically 100% or lower. In some embodiments, the degree of swelling of the layer A can be, for instance, 1.7 or less, 1.5 or less, or even 1.2 or less. The degree of swelling of the layer A is usually 1.0 or greater, and typically above 1.0.

In the PSA sheet in an embodiment where the PSA layer includes a layer A and a layer B placed on the backside of the layer A, the gel fraction of the layer B is not particularly limited. In some embodiments, the B layer preferably has a gel fraction equal to or higher than the gel fraction of the A layer, or possibly above the gel fraction of the A layer. The gel fraction of the B layer can be, for instance, 90% or higher, 95% or higher, 98% or higher, or 99% or higher. The gel fraction of the B layer is theoretically 100% or lower. The gel fraction of the entire PSA layer can be, for instance, 85% or higher, 90% or higher, 95% or higher, 98% or higher, or even 99% or higher. In the PSA layer consisting of the layer A, the gel fraction of the entire PSA layer means the gel fraction of the layer A.

In the PSA sheet in an embodiment where the PSA layer includes a layer A and a layer B placed on the backside of the layer A, the degree of swelling of the layer B is not particularly limited. In some embodiments, the degree of swelling of the B layer is preferably equal to or less than the degree of swelling of the layer A, or possibly below the degree of swelling of the layer A. The degree of swelling of the B layer can be, for instance, 1.5 or less, 1.3 or less, or even 1.1 or less. The degree of swelling of the layer B is usually 1.0 or greater, and typically above 1.0. The degree of swelling of the entire PSA layer can be, for instance, 1.6 or less, 1.4 or less, 1.2 or less, or even 1.1 or less. In the PSA layer consisting of the layer A, the degree of swelling of the entire PSA layer means the degree of swelling of the layer A.

The PSA's gel fraction and degree of swelling relative to water can be adjusted by suitably employing techniques generally known by those skilled in the art at the time of filing this application, such as the monomer composition, the polymer's weight average molecular weight, and the use of crosslinking agent or a polyfunctional monomer.

<PSA Layer>
(1) Layer A

In the PSA sheet peeled by the peeling method disclosed herein, the layer A forming at least the polarizing plate side surface of the PSA layer may be, for instance, a PSA layer formed comprising one, two or more species of PSA selected among various kinds of known PSA such as acrylic PSA, rubber-based PSA (based on natural rubber, synthetic rubber, a mixture of these, etc.), silicone-based PSA, polyester-based PSA, urethane-based PSA, polyether-based PSA, polyamide-based PSA, and fluorine-based PSA. Here, the acrylic PSA refers to a PSA whose primary component is an acrylic polymer. The same applies to the rubber-based PSA and other PSA. It is noted that the concept of polymer here encompasses polymer having a relatively low degree of polymerization, which is sometimes called oligomer in general.

(Acrylic PSA)

From the standpoint of the transparency, weatherability, etc., in some embodiments, as the material forming the layer A, acrylic PSA can be preferably used.

For instance, a preferable acrylic PSA comprises an acrylic polymer formed from monomers including more than 50% (by weight) alkyl (meth)acrylate having, at the ester terminus, a linear or branched alkyl group with 1 up to 20 carbon atoms. Hereinafter, an alkyl (meth)acrylate having, at the ester terminus, an alkyl group with X up to Y number of carbon atoms may be referred to as an "$C_{X-Y}$ alkyl (meth)acrylate." For easy balancing of properties, the ratio of $C_{1-20}$ alkyl (meth)acrylate in the entire monomers (all monomers) can be, for instance, 55% by weight or higher, 60% by weight or higher, or even 70% by weight or higher. For the same reason, of the entire monomers, the ratio of $C_{1-20}$ alkyl (meth)acrylate can be, for instance, 99.9% by weight or less, 99.5% by weight or less, or even 99% by weight or less.

Non-limiting specific examples of the $C_{1-20}$ alkyl (meth)acrylate include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, nonadecyl (meth)acrylate, and eicosyl (meth)acrylate.

Among these, it is preferable to use at least a $C_{4-20}$ alkyl (meth)acrylate and it is more preferable to use at least a $C_{4-18}$ alkyl (meth)acrylate. For example, as the monomer(s), an acrylic PSA including one or each of n-butyl acrylate (BA) and 2-ethylhexyl acrylate (2EHA) is preferable and an acrylic PSA including at least 2EHA is particularly preferable. Other examples of $C_{4-20}$ alkyl (meth)acrylates that are preferably used include isononyl acrylate, n-butyl methacrylate (BMA), 2-ethylhexyl methacrylate (2EHMA), and isostearyl acrylate (ISTA).

In some embodiments, the monomers forming the acrylic polymer may include 40% (by weight) or more $C_{4-18}$ alkyl (meth)acrylate. According to such monomers including a relatively large amount of alkyl (meth)acrylate having an alkyl group with 4 or more carbon atoms at the ester terminus, a highly lipophilic acrylic polymer tends to be formed. The highly lipophilic acrylic polymer is likely to form a PSA layer having a low water-resistant adhesive strength reduction rate. The ratio of $C_{4-18}$ alkyl (meth)acrylate in the monomers can be, for instance, 60% by weight or higher, 70% by weight or higher, 75% by weight or higher, or even 80% by weight or higher. The monomers may include a $C_{6-18}$ alkyl (meth)acrylate up to an aforementioned minimum value (percentage).

From the standpoint of enhancing the cohesion of the PSA layer to prevent cohesive failure, the ratio of $C_{4-18}$ alkyl (meth)acrylate in the monomers is usually suitably 99.5% by weight or lower; it can be 99% by weight or lower, 98% by weight or lower, or even 97% by weight or lower. The monomers may include $C_{6-18}$ alkyl (meth)acrylate(s) up to an upper limit shown above.

In addition to the alkyl (meth)acrylate, the monomers forming the acrylic polymer may include, as necessary, another monomer (copolymerizable monomer) that is able to copolymerize with the alkyl (meth)acrylate. As the copolymerizable monomer, a monomer having a polar group (such as a carboxy group, a hydroxy group and a nitrogen atom-containing ring) may be suitably used. The monomer having a polar group may be useful for introducing a cross-linking point into the acrylic polymer or increasing cohesive strength of the PSA. For the copolymerizable monomer, solely one species or a combination of two or more species can be used.

Non-limiting specific examples of the copolymerizable monomer include those indicated below.

Carboxy group-containing monomers: for example, acrylic acid, methacrylic acid, carboxyethyl acrylate, carboxypentyl acrylate, itaconic acid, maleic acid, fumaric acid, crotonic acid and isocrotonic acid;

Acid anhydride group-containing monomers: for example, maleic anhydride and itaconic anhydride;

Hydroxy group-containing monomers: for example, hydroxyalkyl (meth)acrylates such as 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxyauryl (meth)acrylate and (4-hydroxymethylcyclohexyl)methyl (meth)acrylate;

Monomers having a sulphonate group or a phosphate group: for example, styrene sulphonic acid, allyl sulphonic acid, sodium vinylsulphonate, 2-(meth)acrylamide-2-methylpropane sulphonic acid, (meth)acrylamide propane sulphonic acid, sulphopropyl (meth)acrylate, (meth)acryloyloxy naphthalenesulphonic acid and 2-hydroxyethylacryloyl phosphate;

Epoxy group-containing monomers: for example, epoxy group-containing acrylates such as glycidyl (meth)acrylate and (meth)acrylate-2-ethyl glycidyl ether, allyl glycidyl ether and (meth)acrylate glycidyl ether;

Cyano group-containing monomers: for example, acrylonitrile and methacrylonitrile;

Isocyanato group-containing monomers: for example, 2-isocyanatoethyl (meth)acrylate;

Amido group-containing monomers: for example, (meth)acrylamide; N,N-dialkyl (meth)acrylamides such as N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide and N,N-di(t-butyl) (meth)acrylamide; N-alkyl (meth)acrylamides such as N-ethyl(meth)acrylamide, N-isopropyl(meth)acrylamide, N-butyl(meth)acrylamide and N-n-butyl(meth)acrylamide; N-vinylcarboxylic acid amides such as N-vinylacetamide; a monomer having a hydroxy group and an amide group, for example, an N-hydroxyalkyl(meth)acrylamide such as N-(2-hydroxyethyl)(meth)acrylamide, N-(2-hydroxypropyl)(meth)acrylamide, N-(1-hydroxypropyl)(meth)acrylamide, N-(3-hydroxypropyl)(meth)acrylamide, N-(2-hydroxybutyl)(meth)acrylamide, N-(3-hydroxybutyl)(meth)acrylamide, and N-(4-hydroxybutyl)(meth)acrylamide; a monomer having an alkoxy group and an amide group, for example, an N-alkoxyalkyl(meth)acrylamide such as N-methoxymethyl (meth)acrylamide, N-methoxyethyl(meth)acrylamide, and N-butoxymethyl(meth)acrylamide; and N,N-dimethylaminopropyl(meth)acrylamide, N-(meth)acryloylmorpholine, etc.

Amino group-containing monomers: for example, aminoethyl (meth)acrylate, N,N-dimethylaminoethyl (meth)acrylate and t-butylaminoethyl (meth)acrylate.

Epoxy group-containing monomers: for example, glycidyl (meth)acrylate, methylglycidyl (meth)acrylate, and allyl glycidyl ether.

Monomers having a nitrogen atom-containing ring: for example, N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinylmorpholine, N-vinyl-3-morpholinone, N-vinyl-2-caprolactam, N-vinyl-1,3-oxazin-2-one, N-vinyl-3,5-morpholinedione, N-vinylpyrazole, N-vinylisoxazole, N-vinylthiazole, N-vinylisothiazole and N-vinylpyridazine (such as lactams including N-vinyl-2-caprolactam);

Monomers having a succinimide backbone: for example, N-(meth)acryloyloxy methylene succinimide, N-(meth)acryloyl-6-oxy hexamethylene succinimide and N-(meth)acryloyl-8-oxy hexamethylene succinimide;

Maleimides: for example, N-cyclohexylmaleimide, N-isopropylmaleimide, N-laurylmaleimide and N-phenyl-maleimide;

Itaconimides: for example, N-methyl itaconimide, N-ethyl itaconimide, N-butyl itaconimide, N-octyl itaconimide, N-2-ethylhexyl itaconimide, N-cyclohexyl itaconimide and N-lauryl itaconimide;

Aminoalkyl (meth)acrylates: for example, aminoethyl (meth)acrylate, N,N-dimethylaminoethyl (meth)acrylate, N,N-diethylaminoethyl (meth)acrylate and t-butylaminoethyl (meth)acrylate;

Alkoxy group-containing monomers: for example, an alkoxyalkyl (meth)acrylate such as 2-methoxyethyl (meth)acrylate, 3-methoxypropyl (meth)acrylate, 2-ethoxyethyl (meth)acrylate, propoxyethyl (meth)acrylate, butoxyethyl (meth)acrylate and ethoxypropyl (meth)acrylate; and an alkoxy alkylene glycol (meth)acrylate such as methoxy ethylene glycol (meth)acrylate, methoxy propylene glycol (meth)acrylate, methoxy poly(ethylene glycol) (meth)acrylate and methoxy poly(propylene glycol) (meth)acrylate;

Alkoxysilyl group-containing monomers, for example, (3-(meth)acryloxypropyl)trimethoxysilane, (3-(meth)acryloxypropyl)triethoxysilane, (3-(meth)acryloxypropyl)methyldimethoxysilane, (3-(meth)acryloxypropyl)methyldiethoxysilane;

Vinyl esters: for example, vinyl acetate and vinyl propionate;

Vinyl ethers: for example, vinyl alkyl ethers such as methyl vinyl ether and ethyl vinyl ether;

Aromatic vinyl compounds: for example, styrene, α-methylstyrene and vinyl toluene;

Olefins: for example, ethylene, butadiene, isoprene and isobutylene;

(Meth)acrylic esters having an alicyclic hydrocarbon group: for example, cyclopentyl (meth)acrylate, cyclohexyl (meth)acrylate, isobornyl (meth)acrylate, dicyclopentanyl (meth)acrylate, and adamantyl (meth)acrylate;

(Meth)acrylic esters having an aromatic hydrocarbon group: for example, phenyl (meth)acrylate, phenoxyethyl (meth)acrylate and benzyl (meth)acrylate;

Heterocyclic ring-containing (meth)acrylates such as tetrahydrofurfuryl (meth)acrylate, halogen atom-containing (meth)acrylates such as vinyl chloride and fluorine atom-containing (meth)acrylates, silicon atom-containing (meth)acrylates such as silicone (meth)acrylate, (meth)acrylic esters obtained from terpene compound derivative alcohols and the like.

When using such a copolymerizable monomer, its amount used is not particularly limited, but it is usually suitably at least 0.01% by weight of the entire monomers. From the standpoint of obtaining greater effect of the use of the copolymerizable monomer, the amount of copolymerizable monomer used can be 0.1% by weight or more of the entire monomers, or even 0.5% by weight or more. For easy balancing of adhesive properties, the amount of copolymerizable monomer used is suitably 50% by weight or less of the entire monomers, or preferably 40% by weight or less.

In some embodiments, the monomers used preferably include a carboxy group-containing monomer. Favorable examples of the carboxy group-containing monomer include acrylic acid (AA) and methacrylic acid (MAA). AA and MAA can be used together. When using both AA and MAA, their weight ratio (AA/MAA) is not particularly limited. For instance, it may range between about 0.1 and 10. In some embodiments, the weight ratio (AA/MAA) can be, for instance, about 0.3 or higher, or even about 0.5 or higher. The weight ratio (AA/MAA) can be, for instance, about 4 or lower, or even about 3 or lower.

The use of carboxy group-containing monomer helps quickly wet the layer A surface with an aqueous liquid such as water. This can help reduce the water-peel strength N2. The amount of carboxy group-containing monomer used can be, for instance, 0.05% by weight or more of the entire monomers, 0.1% by weight or more, 0.3% by weight or more, 0.5% by weight or more, or even 0.8% by weight or more. The ratio of carboxy group-containing monomer can be, for instance, 15% by weight or less, 10% by weight or less, 5% by weight or less, 4.5% by weight or less, 3.5% by weight or less, 3.0% by weight or less, or even 2.5% by weight or less. It is preferable that the carboxy group-containing monomer is not used excessively from the standpoint of inhibiting the diffusion of water through the layer A's bulk and reducing the decrease in water-resistant adhesive strength N1. It may also be advantageous that the carboxy group-containing monomer is not used excessively from the standpoint of preventing the water used for determining the water-peel strength N2 from being absorbed in the layer A resulting in a shortage of the water during the peeling.

In some embodiments, the monomers used may include a hydroxy group-containing monomer. With the use of hydroxy group-containing monomer, the PSA's cohesive strength and crosslink density can be adjusted and the normal adhesive strength N0 can be increased. When using a hydroxy group-containing monomer, its amount used can be, for instance, 0.01% by weight or more, 0.1% by weight or more, or even 0.5% by weight or more of the entire monomers. From the standpoint of inhibiting excessive water diffusion into the layer A's bulk, in some embodiments, the amount of hydroxy group-containing monomer used is, for instance, suitably 40% by weight or less of the entire monomers; it can be 30% by weight or less, 20% by weight or less, 10% by weight or less, 5% by weight or less, or even 3% by weight or less. The peeling method disclosed herein can be favorably practiced in an embodiment in which the PSA sheet peeled by the peeling method uses essentially no hydroxy group-containing monomer as the monomer(s) for the layer A.

In some embodiments, the monomers used include an alkoxysilyl group-containing monomer. The alkoxysilyl group-containing monomer is an ethylenic unsaturated monomer having at least one (preferably two or more, e.g. two or three) alkoxysilyl group per molecule. Specific examples thereof are as mentioned earlier. For the alkoxysilyl group-containing monomer, solely one species or a combination of two or more species can be used. With the use of alkoxysilyl group-containing monomer, a crosslinked structure can be introduced in the PSA layer upon condensation reaction of the silanol group (silanol condensation). It is noted that the alkoxysilyl group-containing monomer can also be thought as the silane coupling agent described later.

In an embodiment where the monomers include an alkoxysilyl group-containing monomer, the ratio of the alkoxysilyl group-containing monomer in the total monomers can be, for instance, 0.005% by weight or higher; it is usually suitably 0.01% by weight or higher. From the standpoint of enhancing the tightness of adhesion to adherend, the ratio of the alkoxysilyl group-containing monomer can be, for instance, 0.5% by weight or less, 0.1% by weight or less, or even 0.05% by weight or less.

The monomer composition can be selected so that glass transition temperature determined by the Fox equation based on the monomer composition (or the "acrylic polymer's glass transition temperature" hereinafter) is $-75°$ C. or higher and $-10°$ C. or lower. In some embodiments, the glass transition temperature (Tg) of the acrylic polymer is suitably $-20°$ C. or lower, preferably $-30°$ C. or lower, more preferably $-40°$ C. or lower, or yet more preferably $-50°$ C. or lower, for instance, possibly $-55°$ C. or lower. With lower acrylic polymer's Tg, the tightness of adhesion of the layer A to the adherend generally tends to improve. The layer A tightly adhered to the adherend is likely to prevent penetration of water into the interface between the adherend and the layer A when the PSA sheet is not to be peeled. This can be advantageous from the standpoint of increasing the water-resistant adhesive strength N1 and reducing the water-resistant adhesive strength reduction rate. From the standpoint of readily increasing the normal adhesive strength N0, the acrylic polymer's Tg can be, for instance, $-70°$ C. or higher, or even $-65°$ C. or higher.

Here, the Fox equation is a relational expression between the Tg of a copolymer and glass transition temperatures Tgi of homopolymers of the respective monomers constituting the copolymer.

$$1/Tg=\Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i.

As the glass transition temperatures of homopolymers used for determining the Tg value, values found in publicly known documents are used. For example, with respect to the monomers listed below, as the glass transition temperatures of homopolymers of the monomers, the following values are used:

2-ethylhexyl acrylate $-70°$ C.
n-butyl acrylate $-55°$ C.
methyl methacrylate $105°$ C.
methyl acrylate $8°$ C.
acrylic acid $106°$ C.
methacrylic acid $228°$ C.

With respect to the glass transition temperatures of homopolymers of monomers other than those listed above, values given in "*Polymer Handbook*" (3rd edition, John Wiley & Sons, Inc., Year 1989) are used. When the literature provides two or more values, the highest value is used.

With respect to monomers for which no glass transition temperatures of the corresponding homopolymers are given in *Polymer Handbook*, either, values obtained by the following measurement method are used (see Japanese Patent Application Publication No. 2007-51271). In particular, to a reaction vessel equipped with a thermometer, a stirrer, a nitrogen inlet and a condenser, are added 100 parts by weight of monomer, 0.2 part by weight of azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to $63°$ C. and the reaction is carried out for 10 hours. Then, it is cooled to room temperature, and a homopolymer solution having 33% by weight solids content is obtained. Then, this homopolymer solution is applied onto a release liner by flow coating and allowed to dry to prepare a test sample (a sheet of homopolymer) of about 2 mm thickness. This test sample is cut out into a disc of 7.9 mm diameter and is placed between parallel plates; and while applying a shear strain at a frequency of 1 Hz using a rheometer (ARES, available from Rheometrics Scientific, Inc.), the viscoelasticity is measured in the shear mode over a temperature range of $-70°$ C. to $150°$ C. at a heating rate of $5°$ C./min; and the temperature corresponding to the peak top of the tan 6 curve is taken as the Tg of the homopolymer.

The PSA layer can be formed using a PSA composition that includes monomers having an aforementioned composition in a polymer form, in a non-polymerized form (i.e. a form where polymerizable functional groups are unreacted), or as a mixture of these. The PSA composition may exist in various forms such as a water-dispersed PSA composition in which the PSA (adhesive component) is dispersed in water, a solvent-based PSA composition containing the PSA in an organic solvent, an active energy ray-curable PSA composition prepared to form PSA when cured by active energy rays such as UV rays and radioactive rays, a hot-melt PSA composition that is applied in a thermally melted state and forms PSA when cooled to near room temperature.

In the polymerization, a known or commonly used thermal polymerization initiator or photopolymerization initiator can be used in accordance with the polymerization method and polymerization conditions. These polymerization initiators can be used solely as one species or in a combination of two or more species.

The thermal polymerization initiator is not particularly limited. For example, azo-based polymerization initiator, peroxide-based polymerization initiator, a redox-based polymerization initiator by combination of a peroxide and a reducing agent, substituted ethane-based polymerization initiator and the like can be used. More specific examples include, but not limited to, azo-based initiators such as 2,2'-azobisisobutyronitrile, 2,2'-azobis(2-methylpropionamidine) disulfate, 2,2'-azobis(2-amidinopropane) dihydrochloride, 2,2'-azobis[2-(5-methyl-2-imidazolin-2-yl)propane] dihydrochloride, 2,2'-azobis(N,N'-dimethyleneisobutylamidine), and 2,2'-azobis[N-(2-carboxyethyl)-2-methylpropionamidine] hydrate; persulfates such as potassium persulfate and ammonium persulfate; peroxide-based initiators such as benzoyl peroxide, t-butyl hydroperoxide, and hydrogen peroxide; substituted ethane-based initiators such as phenyl-substituted ethane; redox-based initiators such as combination of a persulfate salt and sodium hydrogen sulfite, and combination of a peroxide and sodium ascorbate. Thermal polymerization can be preferably carried out at a temperature of, for instance, about $20°$ C. to $100°$ C. (typically $40°$ C. to $80°$ C.).

The photopolymerization initiator is not particularly limited. It is possible to use, for instance, ketal-based photopolymerization initiators, acetophenone-based photopolymerization initiators, benzoin ether-based photopolymerization initiators, acylphosphine oxide-based photopolymerization initiators, α-ketol photopolymerization initiators, aromatic sulphonyl chloride-based photopolymerization initiators, photoactive oxime-based photopolymerization initiators, benzoin-based photopolymerization initiators, benzylic photopolymerization initiators, benzophenone-based photopolymerization initiators, and thioxanthone-based photopolymerization initiators.

Such thermal polymerization initiator or photopolymerization initiator can be used in a usual amount in accordance with the polymerization method, embodiment of polymerization, etc., and there are no particular limitations to the amount. For instance, relative to 100 parts by weight of monomers to be polymerized, about 0.001 part to 5 parts by weight (typically about 0.01 part to 2 parts by weight, e.g. about 0.01 part to 1 part by weight) of polymerization initiator can be used.

In the polymerization, various kinds of heretofore known chain transfer agent (which may also be thought as molecular weight-adjusting agent or polymerization degree-adjusting agent) can be used as necessary. As the chain transfer agent, mercaptans can be preferably used, such as n-dodecyl mercaptan, t-dodecyl mercaptan, and thioglycolic acid. Alternatively, a chain transfer agent free of sulfur atoms (a sulfur-free chain transfer agent) can be used as well. Specific examples of the sulfur-free chain transfer agent include anilines such as N,N-dimethylaniline and N,N-diethylaniline; terpenoids such as $\alpha$-pinene and terpinolene; styrenes such as $\alpha$-methylstyrene and $\alpha$-methylstyrene dimer; compounds having benzylidenyl groups such as dibenzylidene acetone, cinnamyl alcohol and cinnamyl aldehyde; hydroquinones such as hydroquinone and naphthohydroquinone; quinones such as benzoquinone and naphthoquinone; olefins such as 2,3-dimethyl-2-butene and 1,5-cyclooctadiene; alcohols such as phenol, benzyl alcohol and allyl alcohol; and benzyl hydrogens such as diphenylbenzene and triphenylbenzene.

For the chain transfer agent, solely one species or a combination of two or more species can be used. When using a chain transfer agent, it can be used in an amount of, for instance, about 0.01 part to 1 part by weight to 100 parts by weight of the monomers. The art disclosed herein can also be preferably implemented in an embodiment that uses no chain transfer agent.

In some preferable embodiments of the peeling method disclosed herein, the PSA sheet has a layer A formed from a water-dispersed PSA composition. Typical examples of the water-dispersed PSA composition include an emulsion-based PSA composition. The emulsion-based PSA composition typically comprises a polymerization product of monomers and an additive used as necessary.

Emulsion polymerization of the monomers is usually carried out in the presence of an emulsifier. The emulsifier used in the emulsion polymerization is not particularly limited; known anionic emulsifiers, nonionic emulsifiers and the like can be used. These emulsifiers can be used singly as one species or in a combination of two or more species.

Non-limiting examples of anionic emulsifiers include sodium lauryl sulfate, ammonium lauryl sulfate, sodium dodecyl benzene sulfonate, sodium polyoxyethylene lauryl sulfate, sodium polyoxyethylene alkyl ether sulfates, ammonium polyoxyethylene alkyl phenyl ether sulfates, sodium polyoxyethylene alkyl phenyl ether sulfates, and sodium polyoxyethylene alkyl sulfosuccinates. Non-limiting examples of non-ionic emulsifiers include polyoxyethylene alkyl ethers, polyoxyethylene alkyl phenyl ethers, polyoxyethylene aliphatic acid esters, and polyoxyethylene-polyoxypropylene block polymers. Reactive functional group-containing emulsifiers (reactive emulsifiers) can be used as well. Examples of reactive emulsifiers include a radically polymerizable emulsifier having a structure of an aforementioned anionic emulsifier or nonionic emulsifier with a radically polymerizable group such as propenyl group and ally ether group introduced therein.

In the emulsion polymerization, the emulsifier can be used in an amount of, for instance, 0.2 part by weight or greater, 0.5 part by weight or greater, or 1.0 part by weight or greater, or even 1.5 parts by weight or greater, relative to 100 parts by weight of the monomers. From the standpoint of increasing the water-resistant adhesive strength N1, reducing the water-resistant adhesive strength reduction rate or increasing the PSA layer's transparency, in some embodiments, the amount of emulsifier used is usually suitably 10 parts by weight or less to 100 parts by weight of the monomers, preferably 5 parts by weight or less, or possibly even 3 parts by weight or less. It is noted that the emulsifier used here for emulsion polymerization can also serve as a hydrophilicity enhance in the layer A.

By emulsion polymerization, a polymerization reaction mixture is obtained as an emulsion in which the polymerization product (polymer) of the monomers is dispersed in water. The water-dispersed PSA composition used for forming the layer A can be preferably produced using the polymerization reaction mixture.

In some embodiments, the PSA sheet may have a layer A formed from a solvent-based PSA composition. The solvent-based PSA composition typically includes a solution polymerization product of the monomers as well as additives used as necessary. The solvent (polymerization solvent) used for the solution polymerization can be suitably selected among heretofore known organic solvents. For instance, it is possible to use one species of solvent or a mixture of two or more solvents, selected among aromatic compounds (typically aromatic hydrocarbons) such as toluene; esters such as ethyl acetate and butyl acetate; aliphatic or alicyclic hydrocarbons such as hexane and cyclohexane; halogenated alkanes such as 1,2-dichloroethane; lower alcohols such as isopropanol (e.g. monohydric alcohols having 1 to 4 carbon atoms); ethers such as tert-butyl methyl ether; and ketones such as methyl ethyl ketone. Solution polymerization gives the polymerization reaction mixture in a form where the polymerization product of the monomers is dissolved in a polymerization solvent. The solvent-based PSA composition used for forming the layer A can be preferably produced using the polymerization reaction mixture.

In some embodiments, the PSA sheet may have a layer A formed from an active energy ray-curable PSA composition. The term "active energy ray" in this Description refers to an energy ray having energy capable of causing a chemical reaction such as polymerization, crosslinking, initiator decomposition, etc. Examples of the active energy ray herein include lights such as ultraviolet (UV) rays, visible lights, infrared lights, radioactive rays such as $\alpha$ rays, $\beta$ rays, $\gamma$ rays, electron beam, neutron radiation, and X rays. A favorable example of the active energy ray-curable PSA composition is a photocurable PSA composition. The photocurable PSA composition has an advantage of being able to easily form even a thick PSA layer. In particular, a UV ray-curable PSA composition is preferable.

The photocurable PSA composition typically comprises at least some of the monomers used to form the composition (possibly a certain species among the monomers or a fraction of its quantity) as a polymer. The polymerization method for forming the polymer is not particularly limited. Heretofore known various polymerization methods can be suitably used. For instance, thermal polymerization (typically carried out in the presence of a thermal polymerization initiator) such as solution polymerization, emulsion polymerization, bulk polymerization, etc.; photopolymerization carried out by irradiating light such as UV ray, etc. (typically in the presence of a photopolymerization initiator); radioactive ray polymerization carried out by irradiating radioactive rays such as $\beta$ rays, $\gamma$ rays, etc.; and the like. In particular, photopolymerization is preferable.

The photocurable PSA composition according to a preferable embodiment comprises a partial polymer (partial polymerization product) of the monomers. Such a partial polymer is typically a mixture of a polymer derived from the monomers and unreacted monomers, and it preferably has a syrup form (viscous liquid). Hereinafter, a partial polymer having such a form may be referred to as "monomer syrup" or simply "syrup." The polymerization method for partial polymerization of the monomers is not particularly limited. Various polymerization methods such as those described earlier can be suitably selected and used. From the standpoint of the efficiency and convenience, a photopolymerization method can be preferably used. Photopolymerization allows easy control of the monomer conversion of the monomers through the polymerization conditions such as the radiation dose (amount) of light.

The monomer conversion of the monomer mixture in the partial polymer is not particularly limited. The monomer conversion can be, for instance, about 70% by weight or less, or preferably about 60% by weight or less. From the standpoint of the ease of preparing the PSA composition containing the partial polymer, the ease of coating, etc., the monomer conversion is usually suitably about 50% by weight or less, or preferably about 40% by weight or less (e.g. about 35% by weight or less). The minimum monomer conversion is not particularly limited. It is typically about 1% by weight or greater, or usually suitably about 5% by weight or greater.

The PSA composition containing a partial polymer of the monomers can be obtained by partially polymerizing a monomer mixture containing the entire amount of the monomers used for preparing the PSA composition by a suitable polymerization method (e.g. a photopolymerization method). The PSA composition containing a partial polymer of the monomers can be a mixture of a partially or fully polymerized product of a part of the monomers used for preparing the PSA composition, and remaining monomers or a partial polymer thereof. As used herein, the "fully polymerized product" indicates that the monomer conversion is above 95% by weight.

In the partial polymer-containing PSA composition, other components (e.g. photopolymerization initiator, polyfunctional monomer, crosslinking agent, hydrophilicity enhancer, etc.) used as necessary can be added. The method of adding such other components is not particularly limited. For instance, it can be included in the monomer mixture in advance or added to the partial polymer as well.

(Hydrophilicity Enhancer)

In the peeling method disclosed herein, the layer A forming one surface of the PSA layer preferably includes a hydrophilicity enhancer in addition to the polymerization reaction product of the monomers. For instance, a preferable PSA sheet has a layer A comprising an acrylic polymer as the polymerization reaction product and further comprising a hydrophilicity enhancer.

As the hydrophilicity enhancer, a suitable species can be selected and used among various materials capable of enhancing the hydrophilicity of the layer A surface. The enhanced hydrophilicity of the layer A can help quickly wet the layer A surface with an aqueous liquid such as water. By this, for instance, when measuring the water-peel strength N2, a drop of water initially dropped is allowed to spread over the layer A surface, following the movement of the peel front line of the PSA sheet peeling from the adherend, and the water-peel strength N2 can be effectively reduced. In the PSA sheet peeling method including moving the peel front line while allowing the aqueous liquid such as water to enter the interface between the PSA sheet and the adherend, the same effect can enhance the peeling properties of the PSA sheet from the adherend.

As the hydrophilicity enhancer, it is possible to use a known anionic surfactant, nonionic surfactant, cationic surfactant, water-soluble plasticizer, water-soluble polymer, etc. For the hydrophilicity enhancer, solely one species or a combination of two or more species can be used.

As the water-soluble plasticizer, various polyols (preferably polyether polyols) can be used. Specific examples include polyethylene glycol, polypropylene glycol, polyoxypropylene sorbitol ether, and polyglycerin. These can be used solely as one species or in a combination of two or more species.

Examples of the water-soluble polymer include polyvinyl alcohol, polyvinyl pyrrolidone, and polyacrylic acid.

Examples of the anionic surfactant include alkyl benzene sulfonates such as sodium dodecyl benzene sulfonate; alkyl sulfates such as sodium lauryl sulfate and ammonium lauryl sulfate; polyetheramines such as polyoxyethylene lauryl amine and polyoxyethylene stearyl amine; polyether sulfates such as sodium polyoxyethylene alkyl ether sulfate, ammonium polyoxyethylene alkyl phenyl ether sulfate and sodium polyoxyethylene alkyl phenyl ether sulfate; polyoxyethylene alkyl ether phosphoric acid esters such as polyoxyethylene stearyl ether phosphoric acid ester and polyoxyethylene lauryl ether phosphoric acid ester; polyoxyethylene alkyl ether phosphates such as sodium salts and potassium salts of the polyoxyethylene alkyl ether phosphoric acid esters; and sodium polyoxyethylene alkyl sulfosuccinate.

Examples of the nonionic surfactant include polyoxyalkylene ethers such as polyoxyethylene alkyl ethers, polyoxyethylene alkyl phenyl ethers, polyoxyethylene glyceryl ether, polyoxypropylene glyceryl ether, and polyoxyethylene bisphenol A ether; polyoxyethylene fatty acid esters; and polyoxyethylene-polyoxypropylene block polymers.

In some embodiments, for instance, an anionic surfactant having at least one —POH group, —COH group or —SOH group can be preferably used. Among them, surfactants having —POH groups are preferable. Such a surfactant typically includes a phosphoric acid ester structure; and it can be, for instance a phosphoric acid monoester (ROP(=O)(OH)$_2$ wherein R is a monovalent organic group), a phosphoric acid diester ((RO)$_2$P(=O)OH wherein R is the same or different monovalent organic group(s)), or a mixture including both a monoester and a diester. Favorable examples of the POH group-containing surfactant include polyoxyethylene alkyl ether phosphoric acid ester. The number of carbon atoms of the alkyl group in the polyoxyethylene alkyl ether phosphoric acid ester can be, for instance, 6 to 20, 8 to 20, 10 to 20, 12 to 20, or even 14 to 20.

The hydrophilicity enhancer content in the layer A is not particularly limited. In some embodiments, the hydrophilicity enhancer content per 100 parts by weight of the monomers forming the polymer included in the layer A can be, for instance, 0.2 part by weight or greater. From the standpoint of obtaining greater effect, it can be 0.5 part by weight or greater, 1.0 part by weight or greater, or even 1.5 parts by weight or greater. From the standpoint of inhibiting excessive diffusion of water into the bulk of the layer A, in some embodiments, the hydrophilicity enhancer content to 100 parts by weight of the monomers is suitably 10 parts by weight or less, preferably 5 parts by weight or less, or possibly 3 parts by weight or less. It is preferable that the hydrophilicity enhancer content is not in large excess in increasing the water-resistant adhesive strength N1 and reducing the water-resistant adhesive strength decreasing rate, or in view of increasing the transparency of the PSA layer as well.

(Silane Coupling Agent)

In some embodiments, the layer A can include a silane coupling agent. According to the layer A including a silane coupling agent, it may be possible to favorably obtain a PSA sheet having a low water-resistant adhesive strength reduction rate and a high water-peel adhesive strength reduction rate.

Examples of the silane coupling agent include silicon compounds having an epoxy structure such as 3-glycidoxypropyltrimethoxysilane, 3-glycidoxypropylmethyldimethoxysilane and 2-(3,4-epoxycyclohexyl) ethyltrimethoxysilane; amino group-containing silicon compounds such as 3-aminopropyltrimethoxysilane, N-(2-aminoethyl)3-aminopropyltrimethoxysilane and N-(2-aminoethyl) 3-aminopropylmethyldimethoxysilane; 3-chloropropyltrimethoxysilane; acetoacetyl group-containing trimethoxysilane; (meth) acrylate group-containing silane coupling agents such as 3-acryloxypropyltrimethoxysilane, and 3-methacryloxypropyltriethoxysilane; and isocyanate group-containing silane coupling agents such as 3-isocyanatopropyltriethoxysilane. Particularly preferable examples include 3-glycidoxypropyltrimethoxysilane and acetoacetyl group-containing trimethoxysilane.

The amount of silane coupling agent used can be selected so that desirable effect is obtained by the use, and is not particularly limited. In some embodiments, the silane coupling agent can be used in an amount of, for instance, 0.001 part by weight or greater to 100 parts by weight of the monomers forming the polymer included in the layer A. From the standpoint of obtaining greater effect, it can be 0.005 part by weight or greater, 0.01 part by weight or greater, or even 0.015 part by weight or greater. From the standpoint of enhancing the tightness of adhesion to adherend, in some embodiments, the amount of silane coupling agent used can be, for instance, 3 parts by weight or less, 1 part by weight or less, or even 0.5 part by weight or less, relative to 100 parts by weight of the monomers forming the layer A.

In an embodiment where the monomers used include an alkoxysilyl group-containing monomer, the alkoxysilyl group-containing monomer can be used as part or all of the silane coupling agent in the layer A.

(Crosslinking Agent)

The layer A can include a crosslinking agent as necessary. The type of crosslinking agent is not particularly limited. For instance, a suitable species can be selected and used among heretofore known crosslinking agents. Specific examples of the crosslinking agent include isocyanate-based crosslinking agent, epoxy-based crosslinking agent, oxazoline-based crosslinking agent, aziridine-based crosslinking agent, carbodiimide-based crosslinking agent, melamine-based crosslinking agent, urea-based crosslinking agent, metal alkoxide-based crosslinking agent, metal chelate-based crosslinking agent, metal salt-based crosslinking agents, hydrazine-based crosslinking agent, and amine-based crosslinking agent. These can be used solely as one species or in a combination of two or more species.

As an example of the isocyanate-based crosslinking agent, a bifunctional or higher polyfunctional isocyanate compound can be used. Examples include aromatic isocyanates such as tolylene diisocyanate, xylene diisocyanate, polymethylene polyphenyl diisocyanate, tris (p-isocyanatophenyl)thiophosphate, and diphenylmethane diisocyanate; alicyclic isocyanates such as isophorone diisocyanate; and aliphatic isocyanates such as hexamethylene diisocyanate. Commercial products include isocyanate adducts such as trimethylolpropane/tolylene diisocyanate trimer adduct (trade name CORONATE L available from Tosoh Corporation), trimethylolpropane/hexamethylene diisocyanate trimer adduct (trade name CORONATE HL available from Tosoh Corporation), and isocyanurate of hexamethylene diisocyanate (trade name CORONATE HX available from Tosoh Corporation). In a water-dispersed PSA composition, it is preferable to use an isocyanate crosslinking agent that is soluble or dispersible in water. For instance, a water-soluble, water-dispersible or self-emulsifying isocyanate-based crosslinking agent can be preferably used. A so-called blocked-isocyanate-type of isocyanate crosslinking agent having a blocked isocyanate group can be preferably used.

As the epoxy-based crosslinking agent, a species having two or more epoxy groups per molecule can be used without particular limitations. A preferable epoxy-based crosslinking agent has 3 to 5 epoxy groups per molecule. Specific examples of the epoxy-based crosslinking agent include N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether. Examples of commercial epoxy-based crosslinking agents include product names TETRAD-X and TETRAD-C available from Mitsubishi Gas Chemical Co., Inc.; product name EPICLON CR-5L available from DIC Corp.; product name DENACOL EX-512 available from Nagase ChemteX Corporation; and product name TEPIC-G available from Nissan Chemical Industries, Ltd. In a water-dispersed PSA composition, it is preferable to use a water-soluble or water-dispersible epoxy-based crosslinking agent.

As the oxazoline-based crosslinking agent, a species having one or more oxazoline groups in one molecule can be used without particular limitations. In the water-dispersed PSA composition, it is preferable to use a water-soluble or water-dispersible oxazoline-based crosslinking agent.

Examples of the aziridine-based crosslinking agent include trimethylolpropane tris[3-(1-aziridinyl)propionate] and trimethylolpropane tris[3-(1-(2-methyl) aziridinylpropionate)].

As the carbodiimide-based crosslinking agent, a low molecular weight compound or a high molecular weight compound having two or more carbodiimide groups can be used. In a water-dispersed PSA composition, it is preferable to use a water-soluble or water-dispersible carbodiimide-based crosslinking agent.

In some embodiments, a peroxide can also be used as the crosslinking agent. Examples of the peroxide include di(2-ethylhexyl) peroxydicarbonate, di(4-t-butylcyclohexyl) peroxydicarbonate, di-sec-butylperoxydicarbonate, t-butylperoxyneodecanoate, t-hexylperoxypivalate, t-butylperoxypivalate, dilauroyl peroxide, di-n-octanoylperoxide, 1,1,3,3-tetramethylbutylperoxyisobutyrate, and dibenzoyl peroxide. Among these, peroxides having particularly excellent crosslinking reaction efficiency include di(4-t-butylcyclohexyl) peroxydicarbonate, dilauroyl peroxide, and dibenzoyl peroxide. It is noted that when a peroxide is used as the polymerization initiator, the remaining peroxide unused in the polymerization reaction can be used for the crosslinking reaction. In this case, when the remaining peroxide is quantified and the proportion of peroxide is less than a prescribed amount, the peroxide can be added as necessary to obtain the prescribed amount. Peroxide can be quantified by the method described in Japanese Patent No. 4971517.

The crosslinking agent content (when two or more crosslinking agents are included, the total amount thereof) is not particularly limited. From the standpoint of obtaining a PSA that exhibits well-balanced adhesive properties such as adhesive strength and cohesive strength, the crosslinking agent content is usually suitably 5 parts by weight or less to 100 parts by weight of the monomers in the PSA composition, preferably about 0.001 part to 5 parts by weight, more preferably about 0.001 part to 4 parts by weight, or yet more preferably about 0.001 part to 3 parts by weight. Alternatively, the PSA composition can also be free of aforementioned crosslinking agents.

(Tackifier Resin)

The layer A may comprise a tackifier resin. Examples of the tackifier resin include rosin-based tackifier resins, rosin derivative tackifier resins, petroleum-based tackifier resins, terpene-based tackifier resins, phenolic tackifier resins, and ketone-based tackifier resins. These can be used singly as one species or in a combination of two or more species.

Examples of the rosin-based tackifier resin include rosins such as gum rosin, wood rosin and tall oil rosin as well as stabilized rosins (e.g. stabilized rosins obtained by disproportionation or hydrogenation of the rosins), polymerized rosins (e.g. multimers, typically dimers, of the rosins) and modified rosins (e.g. unsaturated acid-modified rosins obtained by modification with an unsaturated acid such as maleic acid, fumaric acid or (meth)acrylic acid).

Examples of the rosin derivative tackifier resin include esterification products of the rosin-based tackifier resins (e.g. rosin esters such as stabilized rosin esters and polymerized rosin esters), phenol modification products of the rosin-based resins (phenol-modified rosins) and their esterification products (phenol-modified rosin esters).

Examples of the petroleum-based tackifier resin include aliphatic petroleum resins, aromatic petroleum resins, copolymeric petroleum resins, alicyclic petroleum resins and their hydrogenation products.

Examples of the terpene-based tackifier resin include α-pinene resins, β-pinene resins, aromatic group-modified terpene-based resins, and terpene-phenol resins.

Examples of the ketone-based tackifier resin include ketone-based resins resulting from condensation of ketones (e.g. aliphatic ketones such as methyl ethyl ketone, methyl isobutyl ketone, acetophenone, etc.; alicyclic ketones such as cyclohexanone, methyl cyclohexanone, etc.) with formaldehyde.

In some embodiments, as the tackifier resin, one, two or more species can be preferably selected and used among a rosin-based tackifier resin, rosin derivative tackifier resin and terpene-phenol resin. Among them, a rosin derivative tackifier resin is preferable. Favorable examples include rosin esters such as stabilized rosin ester and polymerized rosin ester.

In a water-dispersed PSA composition, it is preferable to use a water-dispersed tackifier resin in which the tackifier resin as described above is dispersed in water. For instance, a water dispersion of the acrylic polymer and a water-dispersed tackifier resin can be mixed to easily prepare a PSA composition that includes these components at a desirable ratio. In some embodiments, from the standpoint of concerns to environmental health, etc., as the water-dispersed tackifier resin, a species essentially free of at least an aromatic hydrocarbon-based solvent can be preferably used. It is more preferable to use a water-dispersed tackifier resin essentially free of an aromatic hydrocarbon-based solvent and other organic solvents.

Examples of commercial products of water-dispersed tackifier resins including rosin esters include trade names SUPER ESTER E-720, SUPER ESTER E-730-55 and SUPER ESTER E-865NT available from Arakawa Chemical Industries, Ltd.; and trade names HARIESTER SK-90D, HARIESTER SK-70D, HARIESTER SK-70E and NEO-TALL 115E available from Harima Chemicals Group, Inc. Commercial products of terpene-phenol resin (possibly in a form of water-dispersed terpene-phenol resin) include TAMANOL E-100, TAMANOL E-200 and TAMANOL E-200NT available from Arakawa Chemical Industries, Ltd.

The softening point of the tackifier resin is not particularly limited. From the standpoint of inhibiting a decrease in cohesive strength of the PSA layer, it is usually preferable to use a tackifier resin having a softening point of 80° C. or higher. The softening point of the tackifier resin can be 90° C. or higher, 100° C. or higher, 110° C. or higher, or even 120° C. or higher. A tackifier resin having a softening point of 130° C. or higher, or 140° C. or higher can be used as well. From the standpoint of the transparency and the tightness of adhesion to adherend, a tackifier resin having a softening point of 200° C. or lower, or 180° C. or lower can be preferably used. As the softening point of a tackifier resin as referred to herein, the nominal value given in a reference or catalog can be used. If no nominal value is available, the softening point of the tackifier resin can be determined based on the softening point test method (ring and ball method) specified in JIS K5902 or JIS K2207.

From the standpoint of obtaining preferable effects of the use, usually, the amount of tackifier resin used is suitably 1 part by weight or greater to 100 parts by weight of the monomers forming the polymer included in the layer A it can be 5 parts by weight or greater, 10 parts by weight or greater, 15 parts by weight or greater, 20 parts by weight or greater, or even 25 parts by weight or greater. From the standpoint of combining well-balanced cohesion and tightness of adhesion to adherend, the amount of tackifier resin used to 100 parts by weight of the monomers can be, for instance, 70 parts by weight or less, 50 parts by weight or less, or even 40 parts by weight or less. Alternatively, the layer A can be essentially free of a tackifier resin.

In some embodiments of the peeling method disclosed herein, the water resistance reliability can be further enhanced by carrying out a process of increasing the water-peel strength when desired. The PSA sheet showing such a property can be made in, but not limited to, for instance, an embodiment where the layer A includes a tackifier resin. The process of increasing the water-peel strength may be, for instance, applying a temperature higher than the room temperature range after the PSA sheet is applied to an adherend. The temperature applied is not particularly limited and can be selected, considering the ease of working, cost effectiveness and convenience as well as heat resistance of the PSA sheet and the adherend, etc. The temperature may be 45° C. or higher, for instance, or 55° C. or higher. The temperature may be below 150° C., for instance, 120° C. or lower, 100° C. or lower, or even 80° C. or lower. The time for applying the temperature (heating time) is not particularly limited. For instance, it can be 1 hour or longer, 3 hours or longer, or even 1 day or longer. Alternatively, the temperature can be applied for a longer period as long as no significant thermal degradation occurs in the PSA sheet or adherend. In some embodiments, from the standpoint of facilitating the process, the time for applying the temperature can be, for instance, within 14 days, or even within 7 days. The temperature may be applied at once or at intervals.

With respect to the PSA sheet, the water-peel strength N3 after the process of increasing the water-peel strength can be, for instance, 2 times or more of the water-peel strength N2 determined by the aforementioned method, 5 times or more, 10 times or more, 20 times or more, or even 30 times or more. The water-peel strength N3 can be, for instance, 2.0 N/10 mm or greater, 3.0 N/10 mm or greater, or 4.0 N/10 mm or greater. The water-peel strength N3 is measured in the same manner as the measurement of water-peel strength N2 described above, except that the test sample removed from the autoclave is subjected to a process for increasing the water-peel strength.

The PSA composition used for forming the layer A may contain, as necessary, an acid or a base (aqueous ammonia, etc.) used for pH adjustment and so on. Examples of other optional components that can be contained in the composition include various additives generally used in the field of PSA compositions, such as viscosity-adjusting agent (e.g. thickener), leveling agent, plasticizer, filler, colorant including pigment and dye, etc., stabilizing agent, preservative, anti-aging agent, and so on. With respect to these various additives, those heretofore known can be used according to typical methods. Since these do not particularly characterize the present invention, details are omitted.

(2) Layer B

In addition to the layer A forming at least the polarizing plate side surface of the PSA layer, the PSA layer of the PSA sheet peeled by the peeling method disclosed herein may further include a layer B placed on the backside of the layer A. According to such a configuration with layers A and B, for instance, while the layer A provides good water-peeling properties, the layer B allows adjustment of the bulk properties (e.g. water resistance, cohesion, heat resistance, etc.) of the PSA layer. Accordingly, with the PSA layer that includes layers A and B, the resulting PSA sheet is likely to have good water-peeling properties and excellent water resistance reliability. For instance, a PSA sheet having a low water-resistant adhesive strength reduction rate and a high water-peel adhesive strength reduction rate can be suitably obtained. It is also possible to favorably obtain, for instance, a PSA sheet that combines both high adhesiveness and good water-peeling properties at a high level.

The layer B may be placed in direct contact with the layer A's backside, or may be placed to include another layer between itself and the backside of the layer A. The other layer (or the middle layer, hereinafter) is typically a non-adhesive layer; and it is possible to use, similar to the support described later, for instance, a plastic film, a foam sheet, woven and nonwoven fabrics, paper, metal foil, etc. From the standpoint of the PSA sheet's flexibility and conformability to surface structures of the adherend, in some embodiments, it is preferable to employ a PSA layer having a configuration where the layer A and the layer B are layered in direct contact with each other (i.e. not via a middle layer).

For instance, the layer B can be formed to include one, two or more species of PSA selected among various known PSAs such as acrylic PSA, rubber-based PSA, silicone-based PSA, polyester-based PSA, urethane-based PSA, polyether-based PSA, polyamide-based PSA, and fluorine-based PSA. From the standpoint of the transparency, weatherability, etc., in some embodiments, an acrylic PSA can be preferably used as the layer B-forming material. The layer B-forming acrylic PSA can be selected among those exemplified as the acrylic PSA that can be used for the layer A so that desirable properties are obtained when used with the layer A. The layer B may have a single layer structure formed of one layer, or may have a multilayer structure including two or more layers having different compositions.

In some embodiments, the monomers forming the polymer (e.g. acrylic polymer) in the layer B may include a $C_{1-20}$ alkyl (meth)acrylate accounting for 40% by weight or more of the entire monomers. The ratio of $C_{1-20}$ alkyl (meth)acrylate in the entire monomers of the layer B can be, for instance, 98% by weight or lower. From the standpoint of increasing the cohesion of the layer B, it can be 95% by weight or lower, 85% by weight or lower, 70% by weight or lower, or even 60% by weight or lower.

The monomers forming the layer B may include a copolymerizable monomer along with the alkyl (meth)acrylate. The copolymerizable monomer can be suitably selected among those exemplified as the copolymerizable monomer that can be used in the layer A. The amount of copolymerizable monomer used can be, for instance, 5% by weight or more, 15% by weight or more, 30% by weight or more, or even 40% by weight or more of the entire monomers forming the layer B.

In some embodiments, the ratio of carboxy group-containing monomer in the monomers forming the layer B can be, for instance, 2% by weight or lower, 1% by weight or lower, or even 0.5% by weight or lower. A carboxy group-containing monomer may not be essentially used as a layer B-forming monomer. Here, that a carboxy group-containing monomer is not essentially used means that at least intentionally no carboxy group-containing monomer is used. The PSA sheet that has a layer B having such a composition is preferable because it tends to be highly reliable in water resistance.

A favorable example of the PSA sheet having layers A and B has a PSA layer that satisfies one or each of the following: the layer B has a gel fraction higher than that of the layer A and the layer B has a lower degree of swelling than that of the layer A. According to such an embodiment, the resulting PSA sheet is likely to have a low water-resistant adhesive strength reduction rate and a high water-peel adhesive strength reduction rate.

In some embodiments, the layer B may be formed from a photocurable PSA composition or a solvent-based PSA composition. According to the layer B formed from such a composition, the resulting PSA sheet is likely to have good water resistance reliability. For instance, by combining a layer A formed from a water-dispersed PSA composition and a layer B formed from a photocurable PSA composition, or combining a layer A formed from a water-dispersed PSA composition and a layer B formed from a solvent-based PSA composition, it is possible to favorably bring about a PSA sheet having a low water-resistant adhesive strength reduction rate and a high water-peel adhesive strength reduction rate. In some embodiments, from the standpoint of improving water resistance, the layer B substantially not containing a hydrophilicity enhancer can be preferably employed.

<Support>

The PSA sheet peeled by the peeling method disclosed herein may be in a form of on-support PSA sheet including a support bonded to the other surface of the PSA layer. The material of support is not particularly limited and can be suitably selected in accordance with the purpose and application of the PSA sheet. Non-limiting examples of the support that may be used include plastic films including a polyolefin film whose primary component is a polyolefin such as polypropylene and ethylene-propylene copolymer, a polyester film whose primary component is polyester such as polyethylene terephthalate and polybutylene terephthalate, and a polyvinyl chloride film whose primary component is polyvinyl chloride; a foam sheet formed of a foam such as polyurethane foam, polyethylene foam and polychloroprene foam; woven and nonwoven fabrics of single or blended spinning of various fibrous materials (which may be natural fibers such as hemp and cotton, synthetic fibers such as polyester and vinylon, semi-synthetic fibers such as acetate, etc.); paper such as Japanese paper, high-quality paper, kraft paper and crepe paper; and metal foil such as aluminum foil and copper foil. The support may be formed of a composite of these materials. Examples of the support having such a composite structure include a support having a layered structure of metal foil and plastic film, and a plastic sheet reinforced with inorganic fibers such as glass cloth.

As the support, various kinds of film (or support film, hereinafter) can be preferably used. The support film can be a porous film such as a foam film and a non-woven fabric sheet, a non-porous film, or a film having a layered structure of porous and non-porous layers. In some embodiment, a preferable support film comprises a resin film capable of independently holding its shape (standing by itself or independently) as the base film. The "resin film" here means a resin film having a non-porous structure and is typically substantially free of air bubbles (void-less). Thus, the concept of resin film is distinct from foam films and non-woven fabrics. The resin film may have a monolayer structure or a multilayer structure with two or more layers (e.g. a three-layer structure).

Examples of the resin material forming the resin film include resins such as polyester; polyolefin; polycycloolefin derived from a monomer having an aliphatic ring structure such as a norbornene structure; polyamide (PA) such as nylon 6, nylon 66 and partially aromatic polyamide; polyimide (PI); polyamide-imide (PAI); polyether ether ketone (PEEK); polyether sulfone (PES); polyphenylene sulfide (PPS); polycarbonate (PC); polyurethane (PU); ethylene-vinyl acetate copolymers (EVA); polystyrene; polyvinyl chloride; polyvinylidene chloride; fluororesin such as polytetrafluoroethylene (PTFE); acrylic resin such as polymethyl methacrylate; cellulose-based polymer such as diacetyl cellulose and triacetyl cellulose; vinyl butyral-based polymer; arylate-based polymer; polyoxymethylene-based polymer; and epoxy-based polymer. The resin film may be formed from a resin material containing one species of such resin alone or a resin material in which two or more species are blended. The resin film may be non-stretched or stretched (e.g. uniaxially stretched or biaxially stretched).

Favorable examples of the resin material forming the resin film include polyester resins, PPS resins and polyolefin resins. Here, the polyester resin refers to a resin containing more than 50% polyester by weight. Similarly, the PPS resin refers to a resin containing more than 50% PPS by weight and the polyolefin resin refers to a resin containing more than 50% polyolefin by weight.

As the polyester resin, it is typical to use a polyester-based resin whose primary component is a polyester obtainable by polycondensation of a dicarboxylic acid and a diol. Specific examples of the polyester resin include polyethylene terephthalate (PET), polybutylene terephthalate (PBT), polyethylene naphthalate (PEN), and polybutylene naphthalate.

As the polyolefin resin, solely one species of polyolefin or a combination of two or more species of polyolefin can be used. Examples of the polyolefin include an α-olefin homopolymer, a copolymer of two or more species of α-olefin, and a copolymer of one, two or more species of α-olefin and another vinyl monomer. Specific examples include polyethylene (PE), polypropylene (PP), poly-1-butene, poly-4-methyl-1-pentene, ethylene-propylene copolymers such as ethylene-propylene rubber (EPR), ethylene-propylene-butene copolymers, ethylene-butene copolymers, ethylene-vinyl alcohol copolymers and ethylene-ethyl acrylate copolymers. Either a low-density (LD) polyolefin or a high-density (HD) polyolefin can be used. Examples of the polyolefin resin include non-stretched polypropylene (CPP) film, biaxially-stretched polypropylene (OPP) film, low-density polyethylene (LDPE) film, linear low-density polyethylene (LLDPE) film, medium-density polyethylene (MDPE) film, high-density polyethylene (HDPE) film, polyethylene (PE) film in which two or more species of polyethylene (PE) are blended, PP/PE blend film in which polypropylene (PP) and polyethylene (PE) are blended.

Specific examples of the resin film that may be preferably used as the support include PET film, PEN film, PPS film, PEEK film, CPP film and OPP film. Preferable examples in view of the strength include PET film, PEN film, PPS film and PEEK film. From the standpoint of the availability, size stability, optical properties, etc., a preferable example is PET film.

The resin film may include, as necessary, known additives such as photo stabilizer, antioxidant, antistatic agent, colorant (dye, pigment, etc.), fillers, slip agent and anti-blocking agent. The amount of an additive is not particularly limited and can be suitably selected according to the application of the PSA sheet, etc.

The method for producing the resin film is not particularly limited. For instance, heretofore known general resin film formation methods can be suitably employed, such as extrusion molding, inflation molding, T-die casting and calendar rolling.

The support may be substantially formed from such resin film. Alternatively, the support may include a secondary layer in addition to the resin film. Examples of the secondary layer include a layer for adjusting optical properties (such as a colored layer and an antireflection layer), a print layer and laminate layer to provide a desirable appearance to the support or to the PSA sheet, a treated surface layer such as an antistatic layer, a primer layer, and a release layer. The support can also be an optical member described later.

The thickness of the support is not particularly limited and can be suitably selected in accordance with the purpose and application of the PSA sheet. The support's thickness is usually suitably, for instance, 1000 μm or less, 500 μm or less, 100 μm or less, 70 μm or less, 50 μm or less, 25 μm or less, 10 μm or less, or even 5 μm or less. With decreasing thickness of the support, the PSA sheet's flexibility and conformability to surface structures of adherends tend to improve. From the standpoint of the ease of handling, processing and so on, the support's thickness can be, for instance, 2 μm or greater, greater than 5 μm, or even greater than 10 μm. In some embodiments, the support's thickness can be, for instance, 20 μm or greater, 35 μm or greater, or even 55 μm or greater.

Of the support, the face on the side to be bonded to the PSA layer may be subjected as necessary to a heretofore known surface treatment such as corona discharge treatment, plasma treatment, UV irradiation, acid treatment, alkali treatment, primer coating, and antistatic treatment. These surface treatments may increase the tightness of adhesion between the support and the PSA layer, that is, the anchoring of the PSA layer to the support. The composition of the primer is not particularly limited and can be suitably selected among known species. The thickness of the primer layer is not particularly limited and is usually suitably about 0.01 μm to 1 μm, or preferably about 0.1 μm to 1 μm.

Of the support, the backside (or the face on the reverse side of the side to be bonded to the PSA layer) may be subjected as necessary to a heretofore known surface treatment such as release treatment, treatment to enhance bonding ability or adhesiveness, and antistatic treatment. For instance, by treating the backside of the support with a release agent, the unwinding force of the PSA sheet in a rolled form can be reduced. As the release agent, it is possible to use a silicone-based release agent, long-chain alkyl release agent, olefinic release agent, fluorine-based release agent, aliphatic amide-based release agent and molybdenum sulfide, silica powder and the like.

<PSA Sheet>

The PSA layer constituting the PSA sheet may be a cured layer of the PSA composition. In other words, the PSA layer can be formed by providing (e.g. applying) the PSA composition to a suitable surface and then subjecting it to a suitable curing process. When two or more different curing processes (drying, crosslinking, polymerization, etc.) are carried out, these can be done at the same time or in stages. When a partial polymer (acrylic polymer syrup) of the monomers is used for the PSA composition, a final copolymerization reaction is typically carried out as the curing process. That is, the partial polymer is subjected to a further copolymerization reaction to form a fully polymerized product. For instance, with respect to a photocurable PSA composition, photoirradiation is carried out. As necessary, curing processes such as crosslinking and drying can be performed. For instance, with respect to a photocurable PSA composition that needs to be dried, photocuring is carried out preferably after drying. With respect to a PSA composition using a fully polymerized product, processes such as drying (drying with heat) and crosslinking are typically carried out as necessary as the curing process. The PSA layer having a multilayer structure with two or more layers can be prepared by adhering pre-formed PSA layers together. Alternatively, it can be prepared by applying a PSA composition can be applied onto a pre-formed first PSA layer and allowed to cure to form a second PSA layer.

The PSA composition can be applied with, for example, a conventional coater such as a gravure roll coater, a reverse roll coater, a kiss-roll coater, a dip roll coater, a bar coater, a knife coater and a spray coater. With respect to a PSA sheet having a support, as the method for providing a PSA layer onto the support, it is possible to use a direct method where the PSA composition is directly provided to the support or a transfer method where a PSA layer formed on a release face is transferred to the support.

The thickness of the PSA layer is not particularly limited. It can be, for instance, about 3 µm to 1000 µm. From the standpoint of enhancing the reliability of water resistance by forming tight adhesion between the PSA layer and adherend, in some embodiments, the thickness of the PSA layer can be, for instance, 5 µm or greater, 10 µm or greater, 20 µm or greater, 30 µm or greater, 50 µm or greater, greater than 50 µm, 70 µm or greater, 100 µm or greater, or even 120 µm or greater. From the standpoint of preventing the occurrence of leftover adhesive residue due to cohesive failure of the PSA layer, in some embodiments, the thickness of the PSA layer can be, for instance, 500 µm or less, 300 µm or less, 200 µm or less, or even 170 µm or less. The art disclosed herein can also be preferably applied to a PSA sheet whose PSA layer has a thickness of 130 µm or less, 90 µm or less, 60 µm or less, or 40 µm or less. It is noted that in a PSA layer consisting of a layer A, the thickness of the PSA layer means the thickness of the layer A.

With increasing thickness of PSA layer, it generally tends to be more difficult to combine water-peeling properties and water resistance reliability. From such a standpoint, in an embodiment where the PSA layer's thickness is, for instance, greater than 50 µm, it is preferable to employ a configuration with the PSA layer including layers A and B. According to the PSA layer having such a configuration, even if the PSA layer becomes thick, the resulting PSA sheet is likely to combine water-peeling properties and water resistance reliability at a high level.

In the embodiment where the PSA layer includes layers A and B, the layer A may have a thickness of, for instance, 1 µm or greater, 2 µm or greater, 4 µm or greater, 5 µm or greater, 10 µm or greater, or even 15 µm or greater. The thickness of the layer A may be, for instance, 50 µm or less, 45 µm or less, 35 µm or less, or even 25 µm or less. In particular, in an embodiment having a layer A formed from a water-dispersed PSA composition or in an embodiment where the layer A includes a hydrophilicity enhancer, it is also preferable that the layer A's thickness is not too large from the standpoint of increasing the water resistance of the PSA sheet and the transparency of the PSA layer, etc.

In the embodiment in which the PSA layer includes layers A and B, the layer B may have a thickness of, for instance, 5 µm or greater, or even 10 µm or greater. From the standpoint of obtaining greater effect of the layer B provided to the backside of the layer A, in some embodiments, the layer B may have a thickness of, for instance, 20 µm or greater, 30 µm or greater, or 50 µm or greater, 70 µm or greater, or even 100 µm or greater.

In the embodiment in which the PSA layer includes layers A and B, the layer A's thickness in the total thickness of the PSA layer can be, for instance, 90% or less; and it is usually preferably 70% or less. 50% or less, 30% or less, 20% or less, or even 15% or less. From the standpoint of the ease of layer A formation and water-peeling properties of the PSA sheet, in some embodiments, the layer A's thickness in the total thickness of the PSA layer can be, for instance, 3% or greater, It may be 5% or greater, 7% or greater, or 10% or greater.

<Peeling Method>

This Description provides a method for peeling a PSA sheet adhered to a polarizing plate as adherend. The peeling method include a water-peel step in which the PSA sheet is peeled from the adherend, in a state where an aqueous liquid exits at the interface between the adherend and the PSA sheet at the front line of peeling the PSA sheet from the adherend, with the aqueous liquid allowed to further enter the interface following the movement of the peel front line. According to the water peel step, the PSA sheet can be peeled from the polarizing plate as adherend with effective use of the aqueous liquid. As the aqueous liquid, water or a mixed solvent primarily comprising water with a small amount of an additive as necessary can be used. As for other solvents forming the mixed solvent besides water, a lower alcohol (e.g. ethanol), lower ketone (e.g. acetone) and the like that are miscible with water can be used. As the additives, known surfactants and the like can be used. From the standpoint of avoiding contamination of the adherend, in some embodiments, an aqueous liquid essentially free of additives can be preferably used. From the standpoint of environmental health, it is particularly preferable to use water as the aqueous liquid. The water is not particularly limited. For instance, distilled water, ion-exchanged water, tap water or the like can be used in view of the purity, availability, etc., required for the application.

In some embodiments, as in the measurement of water-peel strength N2, for instance, the peeling method can be preferably practiced in an embodiment where the aqueous liquid is supplied onto the adherend (near an edge of the PSA sheet adhered to the adherend); and after the aqueous liquid is allowed, through the edge, to enter the interface between the PSA sheet and the adherend, peeling of the PSA sheet is allowed to proceed without another supply of water (i.e. by using only the aqueous liquid supplied onto the adherend before the peel initiation). During the water-peel step, if the water entering the interface between the PSA sheet and the adherend following the movement of the peel front line runs out in the middle of peeling, additional water may be supplied intermittently or continuously after the start of the water-peel step. For instance, in cases where the adherend absorbs water, the aqueous liquid tends to remain on the post-peel adherend surface or the adhesive face, etc., it may be preferable to employ the embodiment where additional water is supplied after the start of the water-peel step.

The amount of aqueous liquid supplied before the start of peeling is not particularly limited as long as the aqueous liquid can be introduced from the outside of the PSA sheet's bonding area into the interface between the PSA sheet and the adherend. The amount of the aqueous liquid can be, for instance, 5 µL or greater, usually 10 µL or greater, or even 20 µL or greater. There are no particular limitations to the maximum amount of the aqueous liquid. In some embodiments, from the standpoint of facilitating the work, the amount of the aqueous liquid can be, for instance, 10 mL or less, 5 mL or less, 1 mL or less, 0.5 mL or less, 0.1 mL or less, or even 0.05 mL or less. By reducing the amount of the aqueous liquid, it is possible to omit or simplify removal of the aqueous liquid by drying, wiping, etc., after the PSA sheet is peeled off.

At the start of peeling, the procedure for allowing the aqueous liquid to enter the PSA sheet/adherend interface through an edge of the PSA sheet can be carried out, for instance, by ways of inserting the tip of a tool such as cutting knife or needle into the interface at the edge of the PSA sheet; scratching the edge and lifting an end of the PSA sheet with a sort of hook or fingernail; lifting an end of the PSA sheet by sticking a sort of PSA tape or sucker to the PSA sheet's backside near the edge, and so on. By thus forcing the aqueous liquid to enter the interface through the edge of the PSA sheet, it is possible to efficiently form a state having the aqueous liquid at the interface between the adherend and the PSA sheet. Good water-peeling properties following the peel initiation with a procedure of forced entry of the aqueous liquid into the interface to trigger peeling can be favorably combined with highly reliable water resistance obtainable in the absence of such procedure.

Preferably, the PSA sheet to be peeled by the peeling method includes a PSA layer; and of the PSA layer, at least the layer A forming the polarizing plate side surface is preferably formed with a PSA comprising a hydrophilicity enhancer. For instance, the PSA sheet is preferably a PSA sheet disclosed herein. Thus, the peeling method is suitable as a method for peeling a PSA sheet disclosed herein.

The water-peel step according to some embodiments can be preferably implemented in an embodiment where the peel front line is allowed to move at a speed of at least 10 mm/min. Moving the peeling front line at a speed of at least 10 mm/min is comparable to peeling the PSA sheet at a tensile speed of at least 20 mm/min, for instance, when the peel angle is 180°. The speed for moving the peeling front line can be, for instance, 50 mm/min or higher, 150 mm/min or higher, 300 mm/min or higher, or 500 mm/min or higher. According to the peeling method disclosed herein, the PSA sheet is peeled off from the adherend while allowing the aqueous liquid to enter the interface; and this can bring about good water-peeling properties even at a relatively high peeling speed. The maximum speed at which the peel front line moves is not particularly limited. The speed at which the peel front line moves can be, for instance, 1000 mm/min or lower.

The peeling method disclosed herein can be practiced, for instance, in an embodiment where the peeling area of PSA sheet per 10 µL volume of aqueous liquid (e.g. water) used in the method is, for instance, 50 cm$^2$ or larger, or preferably 100 cm$^2$ or larger.

EXAMPLES

Several working examples related to the present invention are described below, but these specific examples are not to limit the present invention. In the description below, "parts" and "%" are by weight unless otherwise specified.

Example 1

(PSA Composition U-1)

Into a 4-necked flask, were placed 100 parts of a monomer mixture containing 2-ethylhexyl acrylate (2EHA), N-vinyl-2-pyrrolidone (NVP), 2-hydroxyethyl acrylate (HEA) and isobornyl acrylate (IBXA) at a weight ratio of 80/35/5/30 along with 0.05 part of product name IRGACURE 651 (available from Ciba Specialty Chemicals, Inc.) and 0.05 part of product name IRGACURE 184 (available from Ciba Specialty Chemicals, Inc.) as photopolymerization initiators. Under a nitrogen atmosphere, the reaction mixture was irradiated with UV rays and photopolymerization was carried out to a viscosity of about 15 Pa s (BH viscometer, No. 5 rotor, 10 rpm, measurement temperature 30° C.) to prepare a monomer syrup containing a partial polymer of the monomer mixture.

To 100 parts of the monomer syrup, were added and uniformly mixed 0.13 part of 1,6-hexanediol diacrylate (HDDA) and 0.33 part of photopolymerization initiator (product name IRGACURE 651 available from Ciba Specialty Chemicals, Inc.) to prepare a UV ray-curable PSA composition U-1.

(Preparation of PSA Composition E-1)

In 100 parts of ion-exchanged water, were mixed and emulsified 85 parts of 2EHA, 13 parts of methyl acrylate (MA), 1.2 parts of AA, 0.8 part of MAA, 0.02 part of (3-methacryloxypropyl)trimethoxysilane (KBM-503 available from Shin-Etsu Chemical Co., Ltd.), 0.048 part of t-dodecyl mercaptan as chain transfer agent and 2.0 part of emulsifier (LATEML E-118B available from Kao Corporation) to prepare an aqueous emulsion of the monomer mixture (monomer emulsion).

Into a reaction vessel equipped with a condenser, nitrogen inlet, thermometer and stirrer, was placed the monomer emulsion. While nitrogen gas is introduced, the resulting mixture was allowed to stir at room temperature for at least one hour. Subsequently, the system was heated to 60° C. and was added 0.1 part of 2,2'-azobis[N-(2-carboxyethyl)-2-methylpropionamidine] hydrate (VA-057 available from Wako Pure Chemical Industries, Ltd.) as polymerization initiator. The reaction was carried out at 60° C. for 6 hours to obtain a water dispersion of acrylic polymer. After the system was cooled to room temperature, to 100 parts of non-volatiles in the water dispersion of acrylic polymer, was added 30 parts (non-volatiles) of tackifier resin emulsion (SUPER ESTER E-865NT available from Arakawa Chemical Industries, Ltd.; a water dispersion of polymerized rosin ester having a softening point of 160° C.). Using 10% aqueous ammonia as pH-adjusting agent and polyacrylic acid (aqueous solution of 36% non-volatiles) as thickener, the pH was adjusted to about 7.5 and the viscosity to about 9 Pa s to prepare an emulsion-based PSA composition E-1.
(Preparation of PSA Sheet)

To a 38 μm thick release film R1 (MRF #38, Mitsubishi Plastics, Inc.) having a release face on one side of polyester film, PSA composition U-1 was applied and covered with a 38 μm thick release film R2 (MRE #38, Mitsubishi Plastics, Inc.) having a release face on one side of polyester film to block air. The resultant was allowed to cure by UV irradiation to form a 130 μm thick PSA layer B1. Subsequently, release film R2 covering PSA layer B1 was removed and the exposed surface was adhered to a 75 μm thick corona-treated polyethylene terephthalate (PET) film to obtain a laminate sheet with the PET film (support), PSA layer B1 and release film R1 layered in this order.

To release film R1 (MRF #38, Mitsubishi Plastics, Inc.), PSA composition E-1 was applied and allowed to dry at 120° C. for 3 minutes to form a 20 μm thick PSA layer A1. Release film R1 covering PSA layer B1 of the laminate sheet was removed. To the exposed surface, PSA layer A1 was adhered to obtain a PSA sheet in an embodiment including a PSA layer having a two-layer structure with PSA layers A1 and B1 layered in direct contact with each other, with the PET film (support) bonded to the layer B1 side surface of the PSA layer. The layer A1 side surface of the PSA sheet is protected with release film R1 used informing the PSA layer A1.
(Preparation of Adherend)

To a butyl acetate solution of a UV ray-curable resin monomer or oligomer whose primary component is urethane acrylate (available from DIC Corporation, product name UNIDIC 17-806, 80% NV), per 100 parts of non-volatiles in the solution, were added 5 parts of photopolymerization initiator (product name IRGACURE 906 available from Ciba Japan K. K.) and 0.03 part of leveling agent (available from DIC Corporation, product name GRANDIC PC4100). Subsequently, butyl acetate was added to the solution to adjust the NV to 75% and cyclopentanone (or CPN hereinafter) was further added to adjust the NV to 50%. Was thus prepared a hard coat layer-forming material for forming a hard coat layer. With the entire amount of the hard coat layer-forming material being 1, the content ratio (mass ratio) of good solvent (CPN) in the hard coat layer-forming material was 0.33. The UV ray-curable resin monomer or oligomer included in the hard coat layer-forming material was a mixture of urethane acrylates of various molecular weights. With the entire amount of the UV ray-curable resin monomer or oligomer being 1, the content ratio (mass ratio) of low molecular weight components (herein, referring to UV ray-curable resin monomers or oligomers having 800 or lower molecular weights) was 0.482.

Onto a transparent TAC film (available from Fujifilm Corporation, product name TD80UL, 80 μm thick, refractive index 1.49), using a die coater, was applied the hard coat layer-forming material to form a coating film. The coating thickness of the hard coat layer-forming material was 13.8 μm. In other words, the hard coat layer-forming material was applied so that the cured coating film (hard coat layer) had a thickness of 7.5 μm when the solvent was assumed to not permeate the film. The coating film was dried at 80° C. for 2 minutes. Subsequently, using a high-pressure mercury lamp, the coating film was irradiated with UV light (cumulative dose of 3000 mJ/cm$^2$) to polymerize the resin monomer. On the TAC film, a hard coat layer was thus fabricated. The hard coat layer had a unique refractive index of 1.53.

Subsequently, to the entire surface of the hard coat layer, the anti-glare layer-forming material shown below was evenly applied, using a die coater. This coating film was heated at 90° C. for two minutes and was allowed to cure by UV irradiation to form a 0.1 μm thick anti-glare layer over the entire surface of the hard coat layer. The anti-glare layer had a refractive index of 1.38. The anti-glare layer-forming material was prepared by diluting a low-refractive material (available from JSR Corporation, product name JUA204, 9.5% NV) with a mixed solvent of methyl isobutyl ketone (MIBK) and t-butanol (TBA) (MIBK:TBA=50:50) and adjusting the NV to 2.0%. The low-refractive material is a UV ray-curable resin comprising a fluorine compound having an ethylenic unsaturated group, an acrylate, a polymerization initiator and hollow nano-silica accounting for about 50% relative to active ingredients.

Was thus obtained a TAC film F1 having a surface with a hard coat layer and an anti-glare layer laminated in this order. As for the adherend in Example 1, the TAC film F1 was subjected to corona treatment of the surface (face subject to adhesion) and used.
<Performance Test>

Using the adherend, the normal adhesive strength N0, water-resistant adhesive strength N1 and water-peel strength N2 of the layer A side of PSA sheet S1 were determined by the methods described earlier. After the corona treatment of the face subject to adhesion, PSA sheet S1 was adhered within 30 minutes. From the measurement values, were determined the water-resistant adhesive strength reduction rate and water-peel adhesive strength reduction rate. The results are shown in Table 1.

Example 2

In this Example, the TAC film F1 was used as the adherend without subjecting the surface (face subject to adhesion) to corona treatment. Otherwise in the same manner as Example 1, the normal adhesive strength N0, water-resistant adhesive strength N1 and water-peel strength N2 of the layer Aside of PSA sheet S1 were determined and the water-resistant adhesive strength reduction rate and water-peel adhesive strength reduction rate were calculated. The results are shown in Table 1.

TABLE 1

|  | Surface treatement of adherend | Normal adhesive strength N0 (N/10 mm) | Water resistance | | Water-peeling properties | |
|---|---|---|---|---|---|---|
|  |  |  | Water-resistant adhesive strength N1 (N/10 mm) | Reduction rate (%) | Water-peel strength N2 (N/10 mm) | Reduction rate (%) |
| Ex. 1 | Corona-treated | 7.3 | 7.1 | 3 | 0.3 | 96 |
| Ex. 2 | — | 9.2 | 9.1 | 1 | 9.1 | 1 |

As shown in Table 1, in Example 1 using a corona-treated adherend, PSA sheet S1 having a low water-resistant adhesive strength reduction rate was easily peeled from the adherend, using a small amount of water. On the other hand, in Example 2 using a non-corona-treated adherend, it was difficult to peel PSA sheet S1 for it had a low water peel adhesive strength reduction rate.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 1, 2 PSA sheets
10 PSA layer (layer A)
10A first surface (adhesive face, polarizing plate side surface)
10B second surface
20 support
20A first face
20B second face (backside)
30 release liner
50 release-linered PSA sheets
70 member (polarizing plate)
110 PSA layer
110A first surface (adhesive face, polarizing plate side surface)
112 layer A
114 layer B
200 PSA sheet-bearing member

The invention claimed is:

1. A method for peeling a pressure-sensitive adhesive sheet adhered on a polarizing plate, wherein
the pressure-sensitive adhesive sheet has a pressure-sensitive adhesive layer, the pressure-sensitive adhesive layer includes a layer A forming at least a polarizing plate side surface of the pressure-sensitive adhesive layer;
the polarizing plate has a surface to which the pressure-sensitive adhesive sheet is adhered and corona-treated or plasma-treated;
the peeling method includes a water-peel step in which the pressure-sensitive adhesive sheet is peeled from the polarizing plate, in a state where an aqueous liquid exits at an interface between the polarizing plate and the pressure-sensitive adhesive sheet at a front line of peeling the pressure-sensitive adhesive sheet from the polarizing plate, with the aqueous liquid allowed to further enter the interface following the movement of the peel front line, and
the polarizing plate has a structure in which a polarizing film is placed between two sheets of triacetyl cellulose film, and the pressure-sensitive adhesive sheet is peeled from at least one surface of the triacetyl cellulose film that forms an outer surface of the polarizing plate in the water-peel step.

2. The pressure-sensitive adhesive sheet peeling method according to claim 1, wherein the peel front line is allowed to move at a speed of at least 10 mm/min in the water-peel step.

3. The pressure-sensitive adhesive sheet peeling method according to claim 1, wherein the layer A comprises a hydrophilicity enhancer.

4. The pressure-sensitive adhesive sheet peeling method according to claim 1, wherein the layer A is water-insoluble and non-water-swellable.

5. The pressure-sensitive adhesive sheet peeling method according to claim 1, wherein the one surface of the triacetyl cellulose film from which the pressure-sensitive adhesive sheet is peeled is protected on its surface with a hard coat layer.

6. The pressure-sensitive adhesive sheet peeling method according to claim 5, wherein an anti-glare layer is provided on top of the hard coat layer.

7. The pressure-sensitive adhesive sheet peeling method according to claim 1, wherein the layer A is an acrylic pressure-sensitive adhesive layer comprising a hydrophilicity enhancer.

* * * * *